US008472907B2

(12) United States Patent
Yamagajo et al.

(10) Patent No.: US 8,472,907 B2
(45) Date of Patent: Jun. 25, 2013

(54) ANTENNA DEVICE AND COMMUNICATION DEVICE

(75) Inventors: Takashi Yamagajo, Kawasaki (JP); Takeshi Takano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 12/957,846

(22) Filed: Dec. 1, 2010

(65) Prior Publication Data

US 2011/0159832 A1 Jun. 30, 2011

(30) Foreign Application Priority Data

Dec. 28, 2009 (JP) ................................ 2009-298179
May 24, 2010 (JP) ................................ 2010-118040

(51) Int. Cl.
*H04B 1/06* (2006.01)

(52) U.S. Cl.
USPC ......... 455/269; 455/550.1; 343/702; 343/795

(58) Field of Classification Search
USPC ............................................ 45/269; 455/269
See application file for complete search history.

(56) References Cited

U.S. PATENT DOCUMENTS 5,898,403 A * 4/1999 Saitoh et al. ........... 343/700 MS
6,741,219 B2 * 5/2004 Shor ............................ 343/795
7,120,719 B2 * 10/2006 Yamaguchi et al. .......... 710/302
7,372,406 B2 5/2008 Shiotsu et al.
7,463,201 B2 * 12/2008 Chiang et al. ................. 343/702
8,000,737 B2 * 8/2011 Caimi et al. ............... 455/550.1
2005/0270237 A1 * 12/2005 Iguchi et al. .................. 343/702
2005/0280580 A1 12/2005 Lin
2007/0247255 A1 10/2007 Shtrom
2008/0169982 A1 7/2008 Mei
2009/0015497 A1 1/2009 Nagumo et al.
2010/0265156 A1 * 10/2010 Minami et al. ................ 343/893

FOREIGN PATENT DOCUMENTS

JP 2004-96341 3/2004
JP 2005-64596 3/2005
WO 2007/094111 8/2007
WO WO 2007/094111 8/2007

OTHER PUBLICATIONS

European Search Report, dated Feb. 14, 2011, for corresponding European Application No. EP 10193268.9.
Sivalingam P et al: "Electronically tunable monopole antenna", Antennas and Propagation Society International Symposium, 2008. AP-S 2008. IEEE, IEEE, Piscataway, NJ, USA, Jul. 5, 2008, pp. 1-4, XP031343025, ISBN: 978-1-4244-2041-4.

(Continued)

*Primary Examiner* — Ajibola Akinyemi
(74) *Attorney, Agent, or Firm* — Katten Muchin Rosenman LLP

(57) ABSTRACT

An antenna device includes: a substrate; a radiating electrode formed on the substrate, a ground electrode formed on the substrate and disposed opposite the radiating electrode, a feed line as a distributed constant transmission line connected via a feed point to the radiating electrode, at least one impedance matching element for impedance-matching the radiating electrode at a prescribed signal frequency by being connected in parallel with the radiating electrode to the feed line at a position a prescribed distance away from the feed point, and a switch, interposed between the at least one impedance matching element and the feed line, for connecting or disconnecting the at least one impedance matching element to or from the feed line in accordance with a prescribed control signal.

9 Claims, 16 Drawing Sheets

OTHER PUBLICATIONS

Emre Erdil et al: "Frequency Tunable Microstrip Patch Antenna Using RF MEMS Technology", IEEE Transactions on Antenna and Propagation, IEEE Service Center, Piscataway, NJ, US, vol. 55, No. 4, Apr. 1, 2007, pp. 1193-1196, XP011176482, ISSN: 0018-926X, DOI: DOI: 10. 1109/TAP.2007.893426. abstract figure 1.

Zhijun Zhang, et al. "Design of Ultrawideband Mobile Phone Stubby Antenna (824 MHz-6 GHz)", IEEE Transactions on Antennas and Propagation, vol. 56, No. 7, Jul. 1, 2008, pp. 2107-2111.

Communication Pursuant to Article 94(3) EPC dated Mar. 18, 2013 from the corresponding European Application No.: 10 193 268.9.

* cited by examiner

ANTENNA DEVICE AND COMMUNICATION DEVICE

CROSS-REFERENCE TO RELATED APPLICATION

This application is based upon and claims the benefit of priority of the prior Japanese Patent Application No. 2009-298179, filed on Dec. 28, 2009, and the Japanese Patent Application No. 2010-118040, filed on May 24, 2010, the entire contents of which are incorporated herein by reference.

FIELD

The embodiments discussed herein are related to an antenna device adapted for use at a plurality of frequency bands that are employed, for example, in a plurality of different communication systems, and also related to a communication device incorporating such an antenna device.

BACKGROUND

Different frequency bands are used for different radio communication services, such as mobile communication, small power data communication, radio frequency identification (RFID), etc. For example, so-called third generation mobile communication systems use frequency bands from 810 to 958 MHz, 1428 to 1525 MHz, 1750 to 1785 MHz, 1845 to 1880 MHz, 2110 to 2170 MHz, etc. On the other hand, the global positioning system (GPS) uses a frequency band from 1563 to 1578 MHz. For local area networks (LANs), frequency bands from 2.4 to 2.5 GHz and 5.47 to 5.725 GHz are used.

In recent years, communication devices, such as mobile phones, have come to be designed to support a plurality of such radio communication services, such as described above, in order to enhance user convenience. Each such communication device is mounted with different antennas for different frequency bands in order to transmit and receive radio signals at different frequency bands used for different radio communication services. However, from the standpoint of reducing the size of the communication device, it is desirable to reduce the number of antennas mounted in the communication device.

In view of the above, research has been carried out to develop an antenna having good antenna characteristics over a wide range of radio signal frequencies (for example, refer to Japanese Laid-open Patent Publication No. 2004-96341, International Publication WO2007/094111, Japanese Laid-open Patent Publication No. 2005-64596, and "Design of Ultrawideband Mobile Phone Stubby Antenna (824 MHz-6 GHz)" by Zhijun Zhang and three others, IEEE TRANSACTIONS ON ANTENNAS AND PROPAGATION, IEE, July 2008, Vol. 56, No. 7, pp. 2107-2111).

In one prior art example, an antenna having a three-dimensional shape is used which is fabricated by folding a V-shaped stamped sheet metal. A capacitor and an inductor are connected in series to the antenna to which are also connected an inductor and a capacitor for short-circuiting the antenna to ground. This antenna has good antenna characteristics for radio frequencies ranging, for example, from 0.8 GHz to 10.6 GHz.

In another prior art example, resonant frequency is adjusted by selectively coupling one of a plurality of inverted-F antennas to a feed line via a switch. In this prior art example, each inverted-F antenna includes at least two antenna conductive elements coupled in series via a switch. Then, the resonant frequency is adjusted by controlling the switch so as to vary the effective length of the antenna.

In still another prior art example, the resonant frequency of a feeder/radiating electrode is adjusted by turning on or off the conduction of a conduction path electrically connecting between a capacitive loading means for loading a capacitance on a higher order mode zero voltage region of the feeder/radiating electrode and a ground electrode. The antenna structure according to this prior art example has good antenna characteristics for radio frequencies ranging, for example, from 0.7 GHz to 2.3 GHz.

In yet another prior art example, the length or thickness of a ground terminal and a feeder terminal connected to a conductor formed as a radiation pattern is varied in order to adjust the antenna impedance.

However, in the Long Term Evolution (LTE), a mobile communication standard for which work on standardization is proceeding in the Third Generation Partnership Project (3GPP), it is expected to also use the 0.7-GHz band. Further, as earlier noted, in wireless LANs, the frequency band from 5.47 to 5.725 GHz is used. There is therefore a need for an antenna device having good antenna characteristics over a wider range of radio frequencies, for example, radio frequencies ranging from 0.7 GHz to 6 GHz.

SUMMARY

According to one embodiment, there is provided an antenna device. The antenna device includes a substrate, a radiating electrode formed on the substrate, a ground electrode formed on the substrate and disposed opposite the radiating electrode, a feed line as a distributed constant transmission line connected via a feed point to the radiating electrode, an impedance matching element for impedance-matching the radiating electrode at a prescribed signal frequency by being connected in parallel with the radiating electrode to the feed line at a position a prescribed distance away from the feed point, and a switch, interposed between the impedance matching element and the feed line, for connecting or disconnecting the impedance matching element to or from the feed line in accordance with a prescribed control signal.

According to another embodiment, there is provided a communication device. The communication device includes an antenna, a control unit, and a radio processing unit. The antenna includes a substrate, a radiating electrode formed on the substrate, a ground electrode formed on the substrate and disposed opposite the radiating electrode, a feed line as a distributed constant transmission line connected via a feed point to the radiating electrode, an impedance matching element for impedance-matching the radiating electrode at a prescribed signal frequency by being connected in parallel with the radiating electrode to the feed line at a position a prescribed distance away from the feed point, and a switch, interposed between the impedance matching element and the feed line, for connecting or disconnecting the impedance matching element to or from the feed line. The control unit generates a control signal for determining whether or not to operate the switch of the antenna to connect the impedance matching element to the feed line in accordance with a frequency band used by a communication application being executed on the communication device, and sends the control signal to the antenna. The radio processing unit receives via the antenna a signal having a frequency falling within the frequency band used by the communication application, and demodulates the received signal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Antenna devices according to various embodiments will be described below with reference to the drawings.

In the antenna device, a feed line for feeding power to a radiating electrode acting as a so-called wideband antenna is formed as a distributed constant transmission line, and one or more impedance matching elements are connected via a switch or switches to the feed line so as to be in parallel with the radiating electrode. Then, by opening or closing the switch or switches according to the radio frequency band used, the impedance of the radiating electrode of the antenna device is matched to that of a circuit which is connected to the antenna, over that frequency band. The antenna device thus achieves good antenna characteristics over a wide range of radio frequencies, for example, radio frequencies ranging from 0.7 GHz to 6 GHz.

Figure 1:
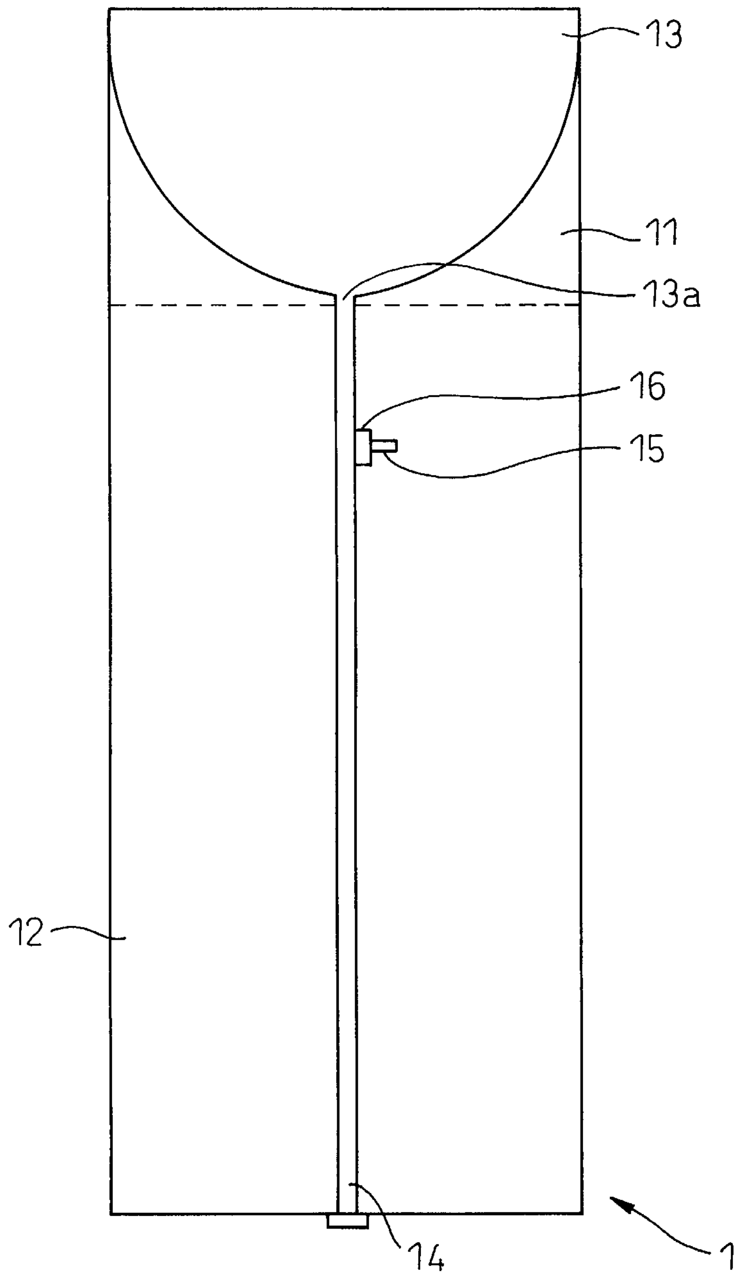
FIG. 1 is a transmissive plan view, in schematic form, of an antenna device according to a first embodiment.
Figure 2:
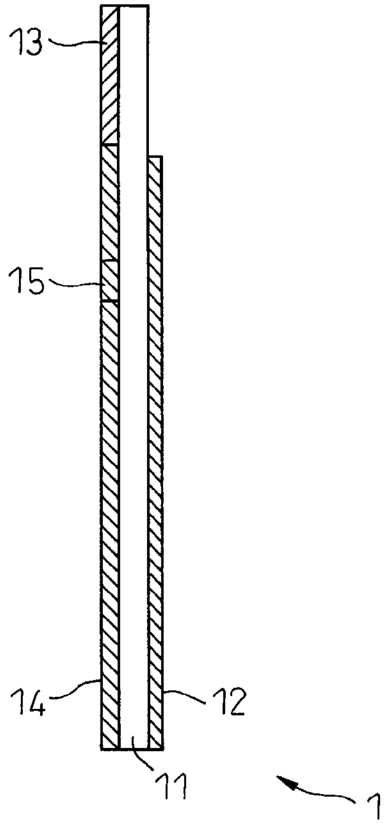
FIG. 2 is a side view, in schematic form, of the antenna device according to the first embodiment.

FIG. 1 is a transmissive plan view, in schematic form, of an antenna device according to a first embodiment, and FIG. 2 is a side view, in schematic form, of the antenna device according to the first embodiment.

The antenna device 1 includes a substrate 11, a ground electrode 12, a radiating electrode 13, a feed line 14, an impedance matching element 15, and a switch 16.

For convenience, in the following description, "width" refers to the dimension measured in the horizontal direction in FIG. 1, and "height" refers to the dimension measured in the vertical direction in FIG. 1, unless specifically defined otherwise.

The substrate 11 is formed from a dielectric or magnetic material. For example, glass epoxy, ceramic, or ferrite is used as the material for forming the substrate 11. The substrate 11 is formed in the shape of a substantially rectangular sheet, and the substrate 11 is smaller in thickness than in height and width. Preferably, the substrate 11 is larger in height than in width in order to provide a larger area for the ground electrode 12.

In the present embodiment, the ground electrode 12 is formed on the back surface of the substrate 11 so as to form a microstrip line together with the feed line 14, as will be described later. In the present embodiment, the ground electrode 12 is formed in a rectangular shape in a portion of the substrate 11 lower than the portion thereof where the radiating electrode 13 is formed, and in such a manner as to be disposed opposite the radiating electrode 13.

The radiating electrode 13 is formed on the front surface of the substrate 11, and is connected to the feed line 14 via a feed point 13*a*. The radiating electrode 13 radiates a signal, transferred via the feed line 14, as a radio signal into the air. Further, the radiating electrode 13 transfers a radio signal, received off the air, to the feed line 14.

The radiating electrode 13 is formed, for example, in a flat surface shape so as to be able to transmit and receive radio signals over a wide frequency range. In the present embodiment, the radiating electrode 13 is formed in a semicircular shape. Then, the radiating electrode 13 is disposed so that the arc of the semicircle is located opposite the ground electrode 12, and the feed point 13*a* is provided at a position where the radiating electrode 13 is closest to the ground electrode 12. The radiating electrode 13 is connected to the feed line 14 via the feed point 13*a*.

The shape of the radiating electrode 13 is not limited to that of the above embodiment. For example, the radiating electrode 13 may be formed in the shape of a fan whose vertex angle is 90°. Then, the radiating electrode 13 is disposed so that the arc of the fan is located opposite the ground electrode 12 and so that the radiating electrode 13 is closest to the ground electrode 12 at an edge of the arc. In this case also, the feed point 13*a* is provided at the position where the radiating electrode 13 is closest to the ground electrode 12.

Further, the edge portion of the radiating electrode 13 that is located opposite the ground electrode 12 may be formed in the shape of a parabola or an elliptical arc that is convex toward the ground electrode 12. Alternatively, the radiating electrode 13 may be formed in some other shape such that the width of the radiating electrode 13 becomes smaller toward its end closest to the ground electrode 12. For example, the radiating electrode 13 may be formed in a trapezoidal shape that tapers off toward its end closest to the ground electrode 12 and that has left and right edges substantially parallel to each other. Further, the radiating electrode 13 may be formed in a three-dimensional shape. For example, the radiating electrode 13 may be of a three-dimensional shape (for example, a cylindrical shape) formed by folding the radiating electrode 13 of the above-described flat surface shape at one or more places in the horizontal or vertical direction.

The radiating electrode 13 and the ground electrode 12 are disposed so that they do not overlap each other when they are projected onto a plane parallel to the surface of the substrate 11 in a direction normal to the surface of the substrate 11.

The feed line 14 transfers the transmit signal received from a communication circuit not depicted on to the radiating electrode 13, and transfers the radio signal received by the radiating electrode 13 on to the communication circuit.

For this purpose, the feed line 14 is formed on the front surface of the substrate 11 in such a manner as to extend downward from the feed point 13*a*. The upper end of the feed line 14 is connected at the feed point 13*a* to the radiating electrode 13. On the other hand, the lower end of the feed line 14 is connected, for example, at the lower end of the substrate 11, to a connector having a prescribed shape. The connector can be, for example, a sub-miniature type A connector.

In the present embodiment, the feed line 14 is formed as a distributed constant transmission line in order to impedance-match the radiating electrode 13 in cooperation with the impedance matching element 15. For this purpose, the feed line 14 and the ground electrode 12 formed on the back surface of the substrate 11 together form a microstrip line.

The ground electrode 12, the radiating electrode 13, and the feed line 14 are each formed from a conductor such as copper, gold, or iron. The ground electrode 12, the radiating electrode 13, and the feed line 14 are formed on the substrate 11, for example, by etching or photolithography.

The impedance matching element 15 is a device having inductance and is, for example, an inductor. One end of the impedance matching element 15 is connected to the switch 16, and the other end of the impedance matching element 15 is connected, for example, via a through-hole, to the ground electrode 12 formed on the back surface of the substrate 11. The impedance matching element 15 may be, for example, a short stub.

The switch 16 connects or disconnects the impedance matching element 15 to or from the feed line 14 in accordance with a control signal from a control circuit not depicted.

The switch 16 here can be, for example, a MEMS (Micro Electro Mechanical Systems) switch.

Figure 3:
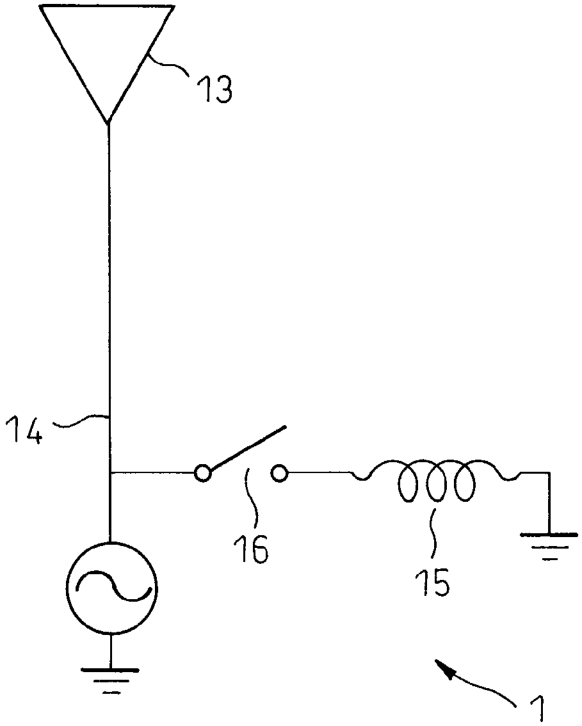
FIG. 3 is a circuit diagram of the antenna device according to the first embodiment.

FIG. 3 is a circuit diagram of the antenna device 1 according to the first embodiment. As illustrated in FIG. 3, the impedance matching element 15 is connected via the switch 16 to the feed line 14 so as to be in parallel with the radiating electrode 13. When the switch 16 is turned on, the impedance matching element 15 is connected to the feed line 14, causing the impedance of the radiating electrode 13 and feed line 14 to change from the impedance presented when the switch 16 is off. By turning on or off the switch 16 in this manner, the antenna characteristics of the antenna device 1 are varied.

It is preferable to design the circuit so that the impedance of the radiating electrode 13 becomes, for example, equal to 50Ω so as to be able to achieve impedance matching over the entire frequency range to be handled by the antenna device 1. For this purpose, it is preferable to increase the size of the radiating electrode 13. However, the size of the radiating electrode 13 is limited by such factors as the size of the communication device in which the antenna device 1 is mounted. If the radiating electrode 13 cannot be made sufficiently large, the conductance of the radiating electrode 13 becomes smaller than 20 mS, for example, in the lower frequency region of the frequency range to be handled by the antenna device 1.

Therefore, when transmitting or receiving such a low frequency radio signal, the antenna device 1 adjusts the combined impedance of the feed line 14 and radiating electrode 13 by connecting the impedance matching element 15 to the feed line 14. Specifically, in the present embodiment, since the feed line 14 is formed as a distributed constant transmission line, the impedance of the feed line 14 varies according to the distance from the feed point 13*a* to the point where the impedance matching element 15 is connected. In view of this, by connecting the impedance matching element 15 in parallel with the radiating electrode 13 to the feed line 14 at a position spaced a suitable distance away from the feed point 13*a* according to the signal frequency, the antenna device 1 can match the impedance of the radiating electrode 13 to that of a circuit connected thereto via the feed line 14.

As a result, when the impedance matching element 15 is connected to the feed line 14, the antenna device 1 can achieve better antenna characteristics for low frequency radio signals than when the impedance matching element 15 is not connected.

The relationship between the inductance $L_{ind}$ possessed by the impedance matching element 15 and the length l of the feed line 14 from the feed point 13*a* to the point where the switch 16 is connected is determined as defined below.

The impedance $Z_L$ of the radiating electrode 13 for a frequency $f_0$ is expressed by the following equation.

$$Z_L = R_{f0} + jX_{f0} \tag{1}$$

where $R_{f0}$ represents the real component of the impedance $Z_L$ and $X_{f0}$ the imaginary component of the impedance $Z_L$.

In this case, in order to make the combined conductance of the feed line 14 and radiating electrode 13 equal to 20 mS which corresponds to the impedance of 50Ω, the length l of the feed line 14 from the feed point 13*a* to the point where the impedance matching element 15 is connected is given by the following equation.

$$l = \frac{1}{\beta}\tan^{-1}\left[\frac{-X_{f0}Z_0 \pm \sqrt{(X_{f0}Z_0)^2 - (Z_0^2 - R_{f0}Z_0)(X_{f0}^2 + R_{f0}^2 - Z_0R_{f0})}}{Z_0^2 - R_{f0}Z_0}\right] \tag{2}$$

$$\beta = \frac{2\pi}{\lambda_{eff}}$$

where $Z_0$ is the characteristic impedance of the feed line 14, which is set to 50Ω. Further, β is a phase constant. On the other hand, $\lambda_{eff}$ represents the signal wavelength corresponding to the frequency $f_0$, as computed by considering wavelength shortening due to the material of the substrate 11. There are two solutions for the length l that satisfies the equation (2). Of the two solutions, it is preferable to select the shorter one in order to reduce the size of the antenna device 1.

Susceptance $B_i$, the capacitive component of the admittance that the entire structure of the radiating electrode 13 and feed line 14 possesses, is expressed by the following equation.

$$B_i = -\frac{1}{Z_0}\frac{j(X_{f0}Z_0 + (Z_0^2 - R_{f0}^2 - X_{f0}^2)\tan\beta l - X_{f0}Z_0\tan^2\beta l)}{R_{f0}^2 + (X_{f0} + Z_0\tan\beta l)^2} \quad (3)$$

Then, when the impedance matching element 15 having inductance $L_{ind}$ that compensates so as to cancel out the susceptance $B_i$ is connected to the feed line 14 so as to be in parallel with the radiating electrode 13, the radiating electrode 13 is impedance-matched. The inductance $L_{ind}$ is expressed by the following equation.

$$L_{ind} = \frac{1}{2\pi f_0 B_i} \quad (4)$$

The antenna characteristics of the antenna device 1 according to the present embodiment will be described below.

To obtain the antenna characteristics, a dielectric having a relative permittivity of 4.4 and a dielectric loss tangent of 0.01 was used as the material for the substrate 11. Further, the ground electrode 12, the radiating electrode 13, and the feed line 14 were each formed from a copper foil having a thickness of 35 μm.

Figure 4:
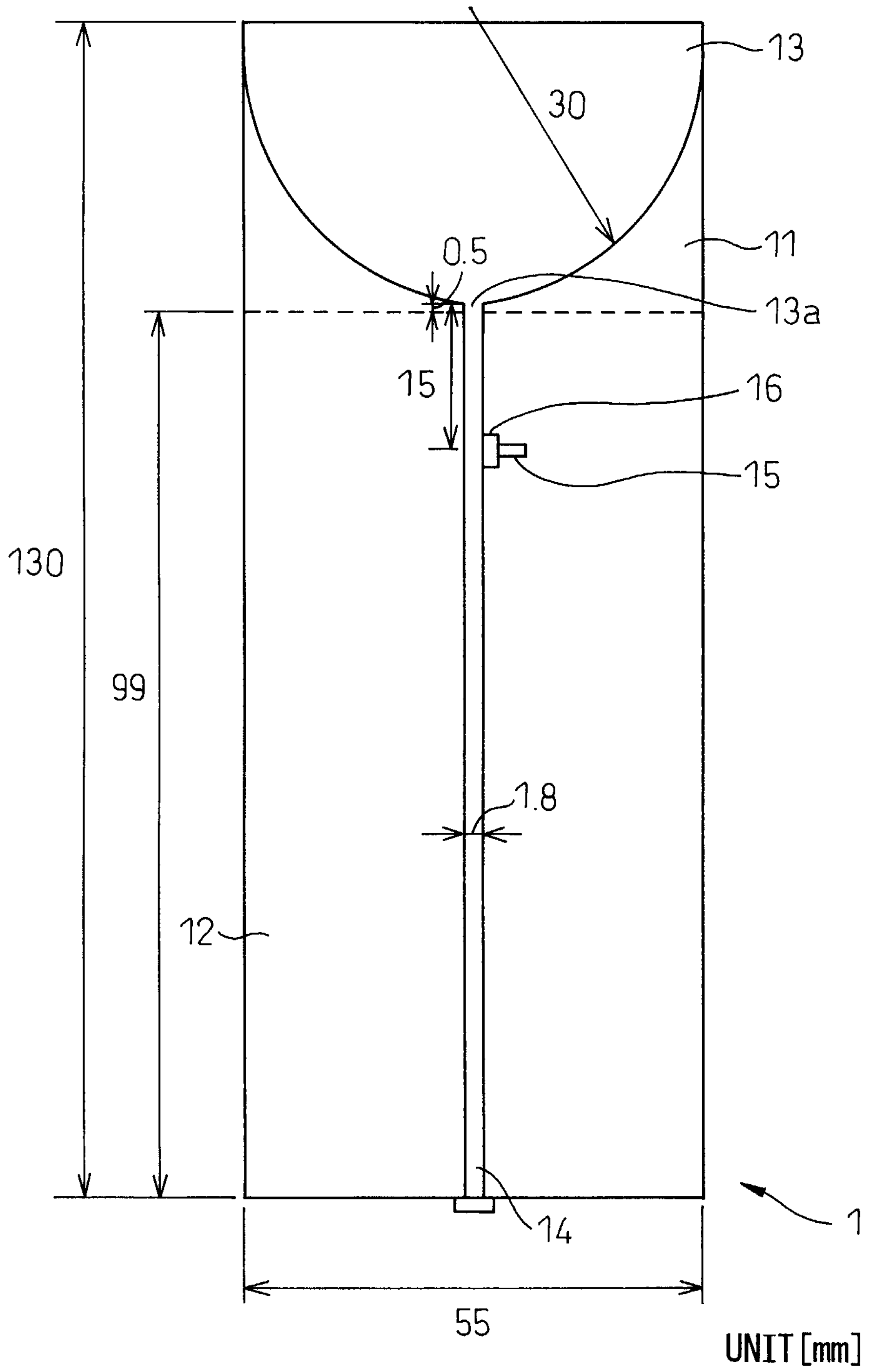
FIG. 4 is a transmissive plan view, in schematic form, of the antenna device according to the first embodiment, illustrating the dimensions of the various parts thereof.

FIG. 4 is a transmissive plan view, in schematic form, of the antenna device 1, illustrating the dimensions of the various parts thereof. In FIG. 4, solid lines indicate the parts disposed on the front surface of the substrate 11, and dashed lines indicate the parts disposed on the back surface of the substrate 11. As illustrated in FIG. 4, the width of the substrate 11 is 55 mm, and the height is 130 mm. The thickness of the substrate 11 is 1 mm. The width of the ground electrode 12 is 55 mm, and the height is 99 mm. The radius of the radiating electrode 13 is 31 mm. The minimum spacing between the radiating electrode 13 and the ground electrode 12 is 0.5 mm. The width of the feed line 14 is chosen to be 1.8 mm so that the characteristic impedance of the feed line 14 becomes approximately equal to 50Ω. The impedance matching element 15 is connected via the switch 16 to a position 15 mm away from the feed point 13*a*. The inductance of the impedance matching element 15 is chosen to be 8 nH.

Figure 5:
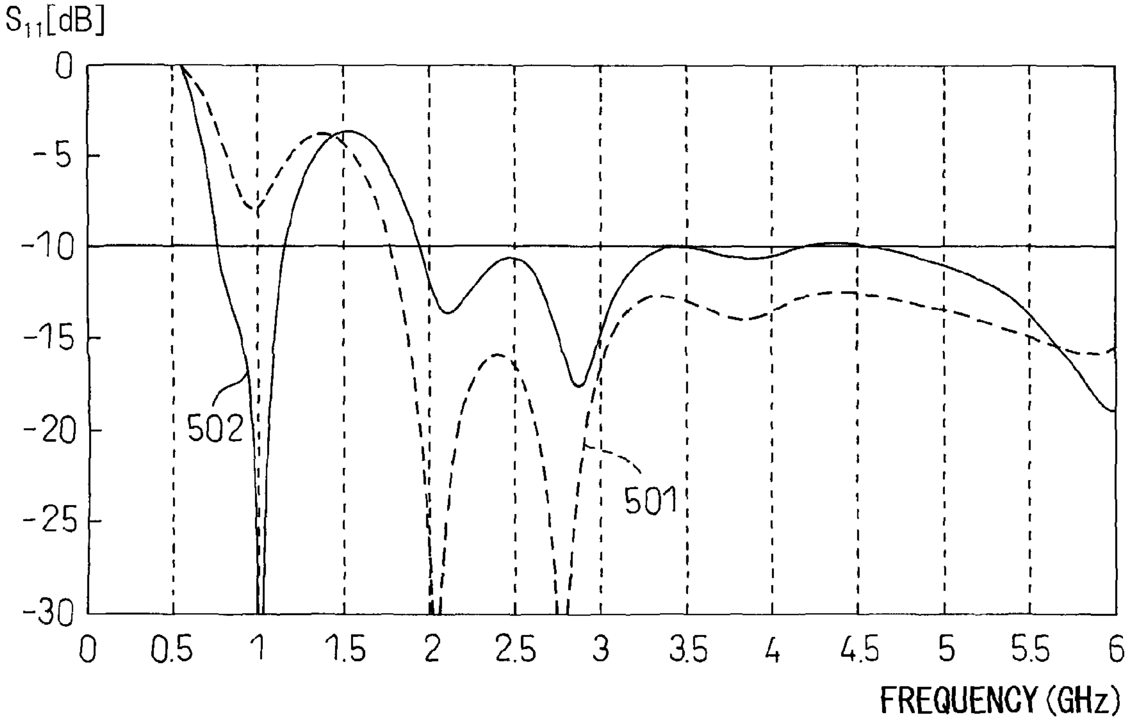
FIG. 5 is a diagram of graphs depicting, as the antenna characteristics of the antenna device according to the first embodiment, the simulation results of the S11 parameter that represents reflection losses for radio frequencies in the range of 0.5 GHz to 6 GHz.

FIG. 5 illustrates, as the antenna characteristics of the antenna device 1 according to the first embodiment, the simulation results of the S11 parameter that represents reflection losses for radio frequencies in the range of 0.5 GHz to 6 GHz. In FIG. 5, the abscissa represents the frequency, and the ordinate represents the absolute value of the S11 parameter in decibels. Graph 501 depicts the simulated value of the S11 parameter when the switch 16 was turned off to disconnect the impedance matching element 15 from the feed line 14. Graph 502 depicts the simulated value of the S11 parameter when the switch 16 was turned on to connect the impedance matching element 15 to the feed line 14. The simulated values depicted by the graphs 501 and 502 were calculated by electromagnetic field simulation using a finite integration method.

As depicted by the graph 501, when the impedance matching element 15 is not connected to the feed line 14, in the frequency range of about 1.8 GHz to 6 GHz the value of the S11 parameter is held below −10 dB which is the reference level against which the antenna characteristics are evaluated. On the other hand, as depicted by the graph 502, when the impedance matching element 15 is connected to the feed line 14, the value of the S11 parameter is also held below −10 dB in the frequency range of about 0.75 GHz to about 1.2 GHz.

Accordingly, by turning on or off the switch 16 according to the frequency used, the antenna device 1 can achieve good antenna characteristics in the frequency range of about 0.75 GHz to about 1.2 GHz as well as the frequency range of about 1.8 GHz to 6 GHz.

As described above, when the impedance matching element is connected to an intermediate point along the feed line so as to be in parallel with the radiating electrode, the antenna device according to the first embodiment can achieve better antenna characteristics in the lower frequency range than when the impedance matching element 15 is not connected. Further, by switching the connection between the impedance matching element and the feed line on and off by the switch connected between the impedance matching element and the feed line, the antenna device can expand the frequency range over which the impedance matching of the radiating electrode can be achieved. In this way, the antenna device can be used over a wide frequency range.

Next, an antenna device according to a second embodiment will be described. The antenna device according to the second embodiment includes a plurality of switches and impedance matching elements for connection to the feed line. With this configuration, the antenna device according to the second embodiment can improve the antenna characteristics over a wider range of radio frequencies, for example, radio frequencies ranging from about 0.75 GHz to 6 GHz, than the antenna device according to the first embodiment can.

Figure 6:
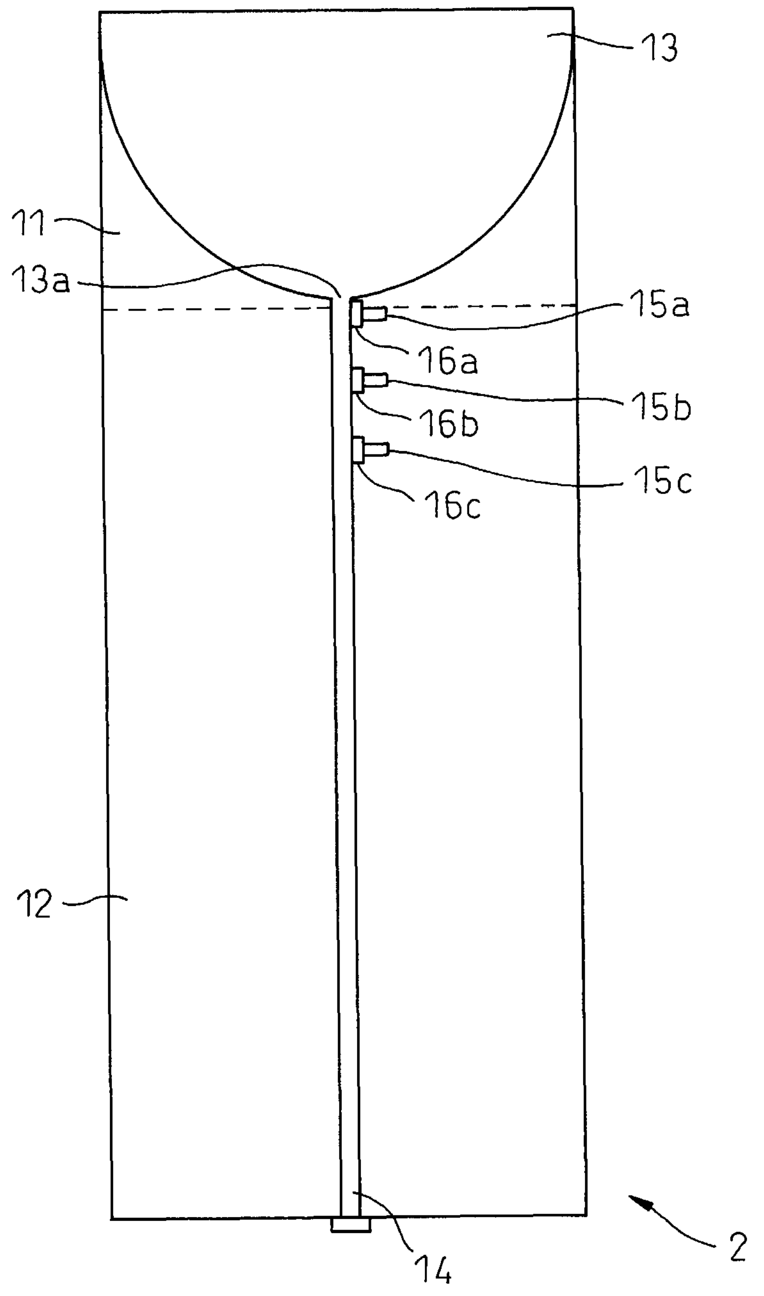
FIG. 6 is a transmissive plan view, in schematic form, of an antenna device according to a second embodiment.
Figure 7:
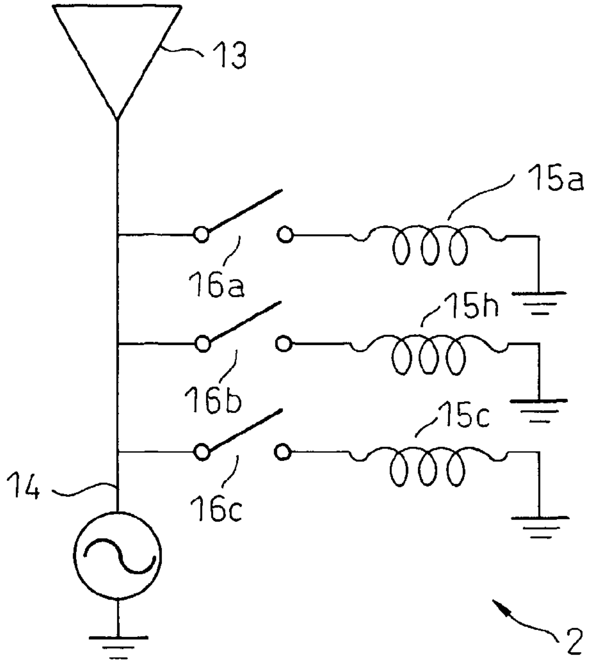
FIG. 7 is a circuit diagram of the antenna device according to the second embodiment.

FIG. 6 is a transmissive plan view, in schematic form, of the antenna device 2 according to the second embodiment, and FIG. 7 is a circuit diagram of the antenna device 2. As illustrated in FIGS. 6 and 7, three impedance matching elements 15*a*, 15*b*, and 15*c* are provided for connection to the feed line 14 of the antenna device 2 via switches 16*a*, 16*b*, and 16*c*, respectively. In FIGS. 6 and 7, the various parts of the antenna device 2 are designated by the same reference numerals as those used to designate the corresponding component parts of the antenna device 1 depicted in FIGS. 1 and 2. The antenna device 2 differs from the antenna device 1 by the inclusion of the plurality of impedance matching elements and switches for connection to the feed line 14.

The radiating electrode 13 is impedance-matched at various different frequencies by selectively connecting the respective impedance matching elements 15*a*, 15*b*, and 15*c* to the feed line 14. To achieve this, each of the impedance matching elements 15*a*, 15*b*, and 15*c* is connected to the feed line 14 at the position that satisfies the earlier given equation (2) for the corresponding frequency. Further, each of the impedance matching elements 15*a*, 15*b*, and 15*c* has inductance that satisfies the equation (4).

It is assumed that each part of the antenna device 2 has a similar shape and size to the corresponding part of the antenna device 1 depicted in FIG. 4 and is formed from the same material. In this case, the impedance matching elements 15*a*, 15*b*, and 15*c* are connected to the feed line 14 at positions 0 mm, 9.5 mm, and 15 mm respectively away from the feed point 13*a* to make the radiating electrode 13 be impedance-matched, for example, at frequencies 1.5 GHz, 1.25 GHz, and 1 GHz, respectively. The impedance matching elements 15*a*, 15*b*, and 15*c* have inductances of 4 nH, 4 nH, and 8 nH, respectively.

Figure 8:
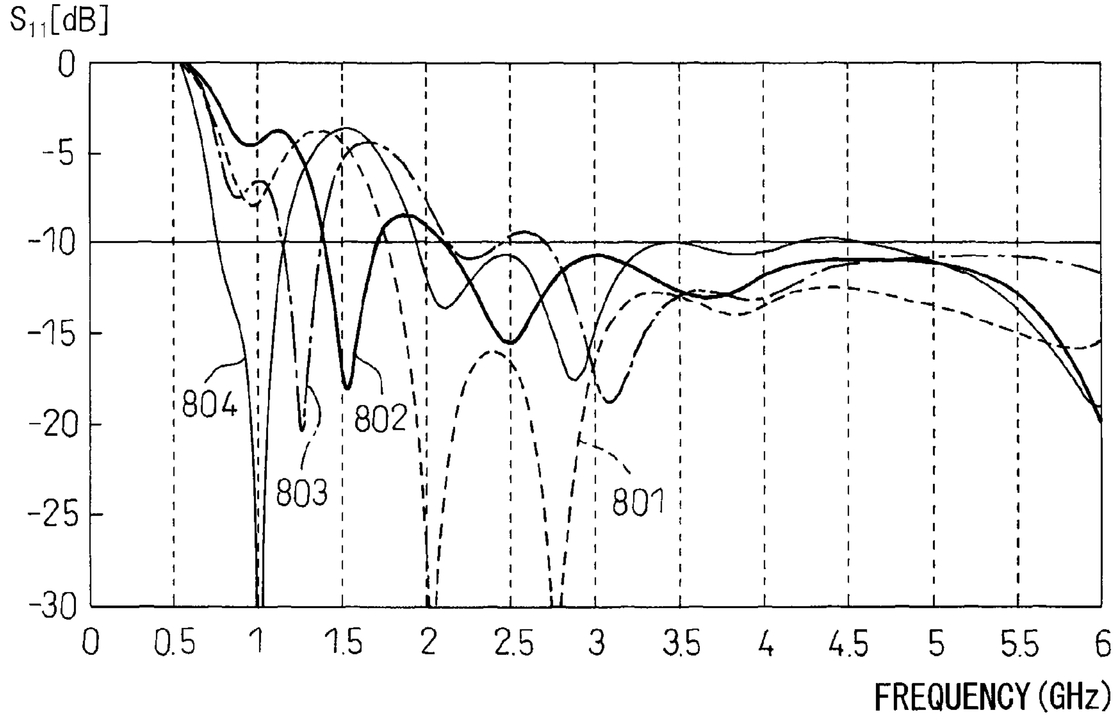
FIG. 8 is a diagram of graphs depicting the simulation results of the S11 parameter for radio frequencies in the range of 0.5 GHz to 6 GHz for explaining the antenna characteristics of the antenna device according to the second embodiment.

FIG. 8 illustrates the simulation results of the S11 parameter for explaining the antenna characteristics of the antenna device 2 according to the second embodiment. In FIG. 8, the abscissa represents the frequency, and the ordinate represents the absolute value of the S11 parameter in decibels. Graph 801 depicts the simulated value of the S11 parameter when all the switches 16*a* to 16*c* were turned off to disconnect all the impedance matching elements 15*a* to 15*c* from the feed line 14. Graph 802 depicts the simulated value of the S11 parameter when the switch 16*a* was turned on to connect the impedance matching element 15*a* to the feed line 14. Graph 803 depicts the simulated value of the S11 parameter when the switch 16*b* was turned on to connect the impedance matching element 15*b* to the feed line 14. Graph 804 depicts the simulated value of the S11 parameter when the switch 16*c* was turned on to connect the impedance matching element 15*c* to the feed line 14. The simulated values depicted by the graphs 801 to 804 were calculated by electromagnetic field simulation using a finite integration method.

As depicted by the graph 801, when none of the impedance matching elements 15*a* to 15*c* are connected to the feed line 14, the value of the S11 parameter is held below −10 dB in the frequency range of about 1.8 GHz to 6 GHz. On the other hand, as depicted by the graph 802, when the impedance matching element 15*a* is connected to the feed line 14, the value of the S11 parameter is also held below −10 dB in the frequency range of about 1.4 GHz to about 1.8 GHz. Similarly, as depicted by the graph 803, when the impedance matching element 15*b* is connected to the feed line 14, the value of the S11 parameter is also held below −10 dB in the frequency range of about 1.2 GHz to about 1.4 GHz. Further, as depicted by the graph 804, when the impedance matching element 15*c* is connected to the feed line 14, the value of the S11 parameter is also held below −10 dB in the frequency range of about 0.75 GHz to about 1.2 GHz.

In this way, by connecting one of the impedance matching elements 15*a* to 15*c* to the feed line 14 or disconnecting all the impedance matching elements from the feed line 14, the antenna device 2 can achieve good antenna characteristics over the frequency range of about 0.75 GHz to 6 GHz.

As described above, the antenna device 2 according to the second embodiment includes the plurality of impedance matching elements disposed at different positions according to the frequencies at which the radiating electrode is to be impedance-matched. Therefore, by connecting one of the impedance matching elements to the feed line or disconnecting all the impedance matching elements from the feed line according to the frequency used, the antenna device 2 can achieve good antenna characteristics for that frequency. As a result, the antenna device having such a plurality of impedance matching elements can maintain good antenna characteristics over a wider range of frequencies, for example, over the entire frequency range of about 0.75 GHz to 6 GHz, than the antenna device having only one impedance matching element can.

Figure 9:
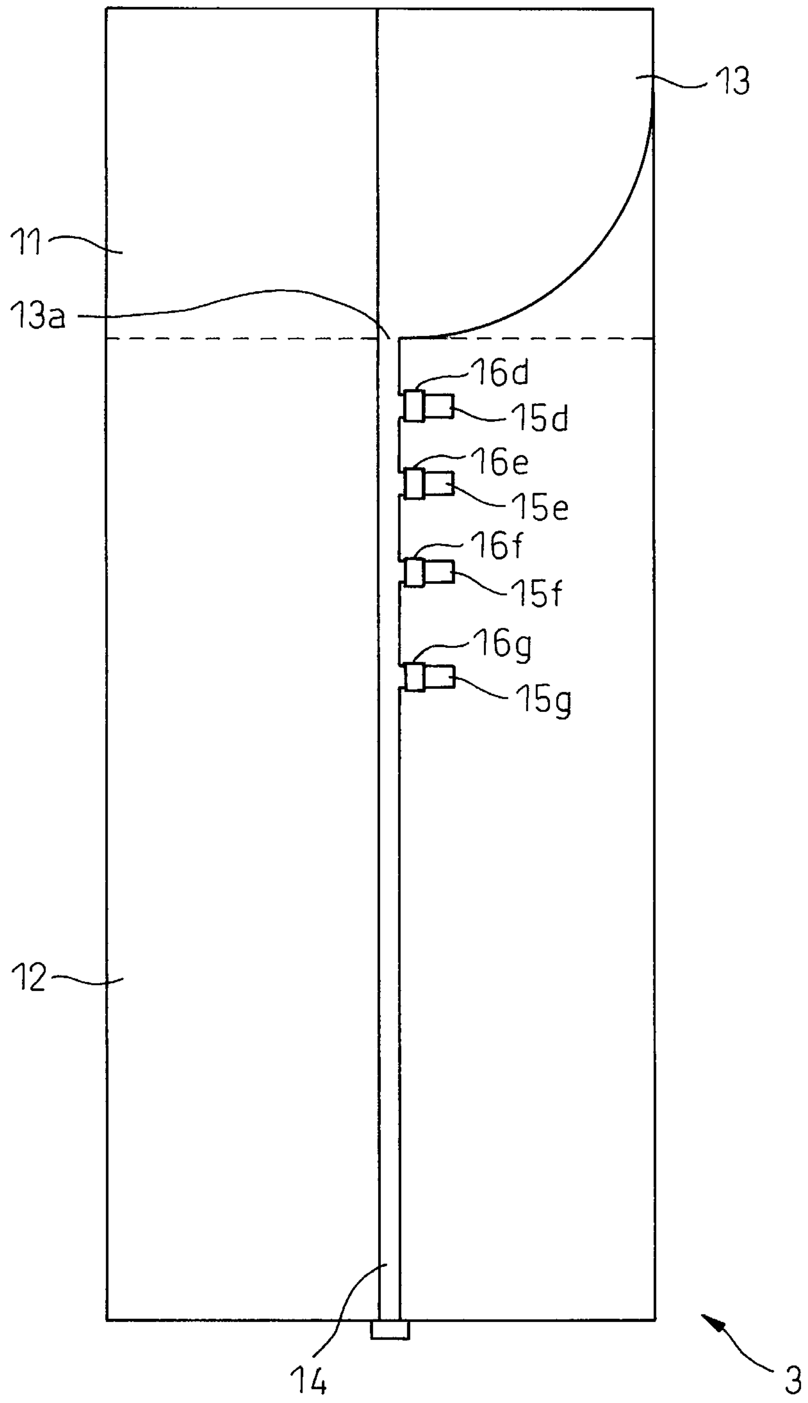
FIG. 9 is a transmissive plan view, in schematic form, of an antenna device according to a third embodiment.

FIG. 9 is a transmissive plan view, in schematic form, of an antenna device 3 having four impedance matching elements according to a third embodiment. In FIG. 9, solid lines indicate the parts disposed on the front surface of the substrate 11, and dashed lines indicate the parts disposed on the back surface of the substrate 11. The four impedance matching elements 15*d*, 15*e*, 15*f*, and 15*g* are provided for connection to the feed line 14 of the antenna device 3 via switches 16*d*, 16*e*, 16*f*, and 16*g*, respectively. In FIG. 9, the various parts of the antenna device 3 are designated by the same reference numerals as those used to designate the corresponding component parts of the antenna device 2 depicted in FIG. 6. The antenna device 3 differs from the antenna device 2 in the number of switches and impedance matching elements provided for connection to the feed line 14. The radiating electrode 13 has a shape generated by combining a fan having a vertex angle of 90° with a rectangle adjacent to the upper part of the fan. Then, the radiating electrode 13 is disposed so that the arc of the fan is located opposite the ground electrode 12 and so that the radiating electrode 13 is closest to the ground electrode 12 at an edge of the arc, and the feed point 13*a* is provided at the position where the radiating electrode 13 is closest to the ground electrode 12.

In this embodiment, the substrate 11 is formed, for example, from a dielectric material having a relative permittivity of 4.4 and a dielectric loss tangent of 0.01. Further, the ground electrode 12, the radiating electrode 13, and the feed line 14 are each formed from a copper foil having a thickness of 35 μm. The width of the substrate 11 is, for example, 50 mm, and the height is 130 mm. The thickness of the substrate 11 is 1 mm. The width of the ground electrode 12 is 50 mm, and the height is 100 mm. The radius of the fan-shaped portion in the lower part of the radiating electrode 13 is 22.5 mm, and the rectangular portion in the upper part has a width of 25 mm and a height of 7 mm. The minimum spacing between the radiating electrode 13 and the ground electrode 12 is 0.5 mm. The width of the feed line 14 is chosen to be 1.8 mm so that the characteristic impedance of the feed line 14 becomes approximately equal to 50Ω.

The impedance matching elements 15*d*, 15*e*, 15*f*, and 15*g* are connected to the feed line 14 at positions that satisfy the earlier given equation (2) for respectively different frequencies. Further, each impedance matching element has the inductance defined in accordance with the earlier given equation (4).

The impedance matching elements 15*d*, 15*e*, 15*f*, and 15*g* are connected to the feed line 14 at positions 6 mm, 13 mm, 21 mm, and 30.5 mm respectively away from the feed point 13*a* to make the radiating electrode 13 be impedance-matched, for example, at frequencies 1.7 GHz, 1.3 GHz, 0.9 GHz, and 0.75 GHz, respectively. The impedance matching elements 15*d*, 15*e*, 15*f*, and 15*g* have inductances of 1.3 nH, 1.5 nH, 2.88 nH, and 1.88 nH, respectively.

Figure 10:
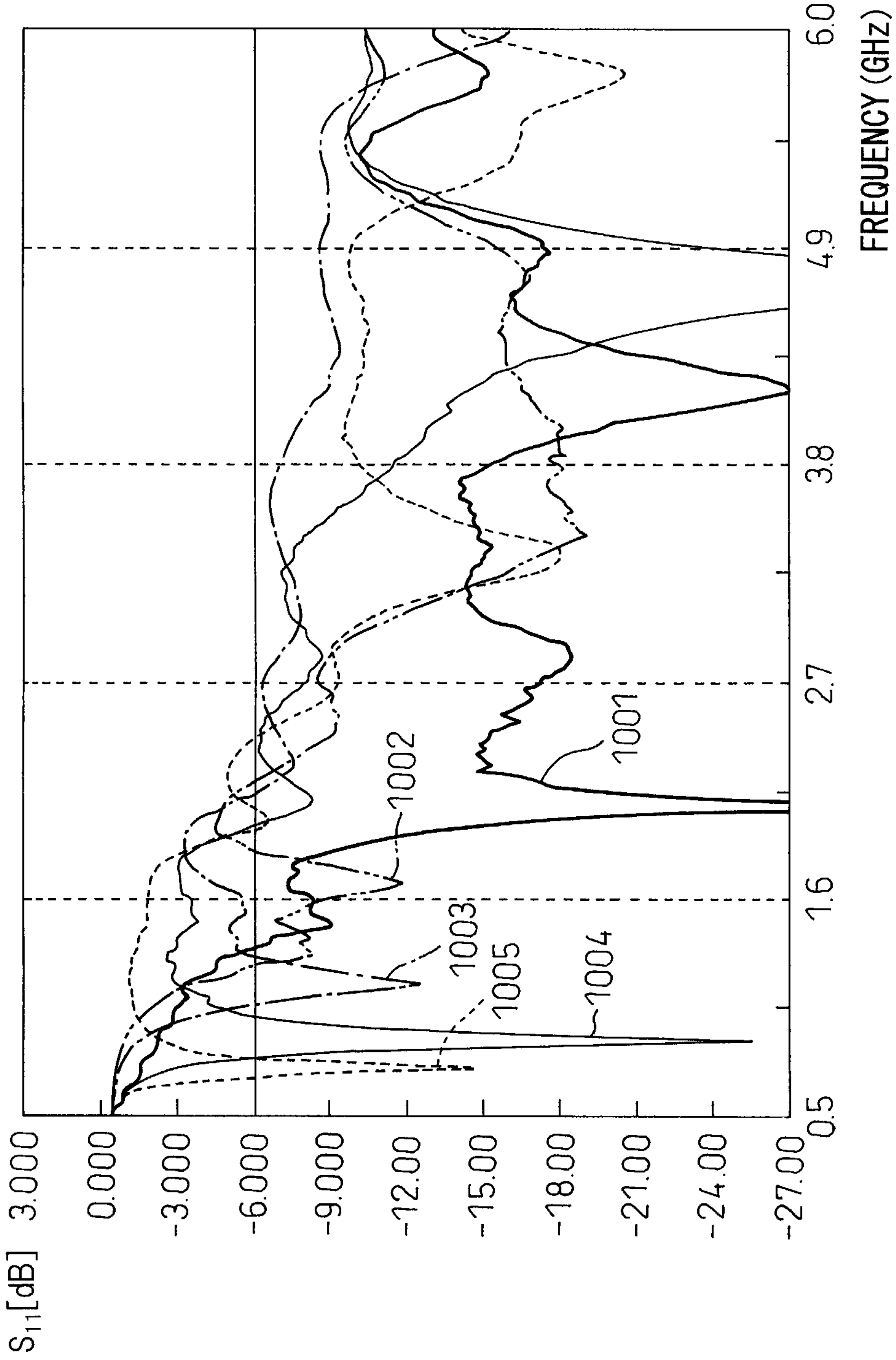
FIG. 10 is a diagram of graphs depicting the measured results of the S11 parameter for radio frequencies in the range of 0.5 GHz to 6 GHz for explaining the antenna characteristics of the antenna device according to the third embodiment.

FIG. 10 illustrates the measured results of the S11 parameter for explaining the antenna characteristics of the antenna device 3 according to the third embodiment.

In FIG. 10, the abscissa represents the frequency, and the ordinate represents the absolute value of the S11 parameter in decibels. Graph 1001 depicts the measured value of the S11 parameter when all the switches 16*d* to 16*g* were turned off to disconnect all the impedance matching elements 15*d* to 15*g* from the feed line 14. Graph 1002 depicts the measured value of the S11 parameter when the switch 16*d* was turned on to connect the impedance matching element 15*d* to the feed line 14. Graph 1003 depicts the measured value of the S11 parameter when the switch 16*e* was turned on to connect the impedance matching element 15*e* to the feed line 14. Graph 1004 depicts the measured value of the S11 parameter when the switch 16*f* was turned on to connect the impedance matching element 15*f* to the feed line 14. Graph 1005 depicts the measured value of the S11 parameter when the switch 16*g* was turned on to connect the impedance matching element 15*g* to the feed line 14.

As depicted by the graph 1001, when none of the impedance matching elements 15*d* to 15*g* are connected to the feed line 14, in the frequency range of about 1.4 GHz to 6 GHz the value of the S11 parameter is held below −6 dB which is believed to be the value below which the antenna operates properly in the communication device such as a mobile phone. On the other hand, as depicted by the graph 1002, when the impedance matching element 15*d* is connected to the feed line 14, the value of the S11 parameter is also held below −6 dB in the frequency range of about 1.2 GHz to about 1.8 GHz. Similarly, as depicted by the graph 1003, when the impedance matching element 15*e* is connected to the feed line 14, the value of the S11 parameter is also held below −6 dB in the frequency range of about 1.1 GHz to about 1.3 GHz. Further, as depicted by the graph 1004, when the impedance matching element 15*f* is connected to the feed line 14, the value of the S11 parameter is also held below −6 dB in the frequency range of about 0.8 GHz to about 1.0 GHz. Furthermore, as depicted by the graph 1005, when the impedance matching element 15*g* is connected to the feed line 14, the value of the S11 parameter is also held below −6 dB in the frequency range of about 0.7 GHz to about 0.8 GHz.

In this way, by connecting one of the impedance matching elements 15*d* to 15*g* to the feed line 14 or disconnecting all the impedance matching elements from the feed line 14, the antenna device 3 can achieve good antenna characteristics over the frequency range of about 0.7 GHz to 6 GHz.

The feed line may be formed from some other suitable type of conductive line that serves as a distributed constant transmission line. For example, the feed line may be formed as a coplanar waveguide or a strip line.

Figure 11A:
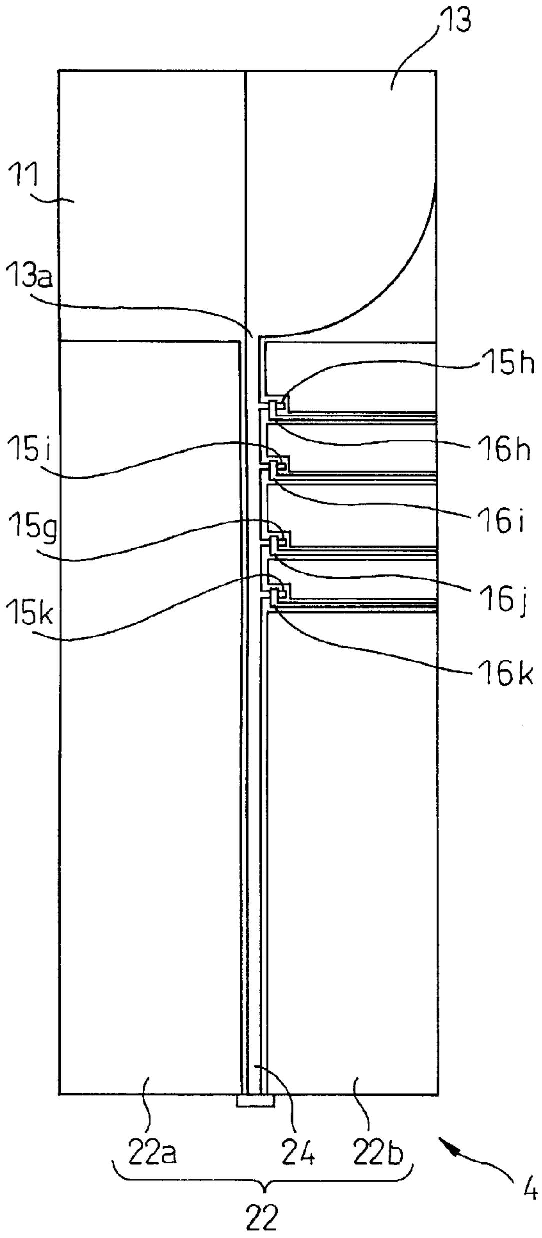
FIG. 11A is a plan view, in schematic form, of an antenna device according to a fourth embodiment.
Figure 11B:
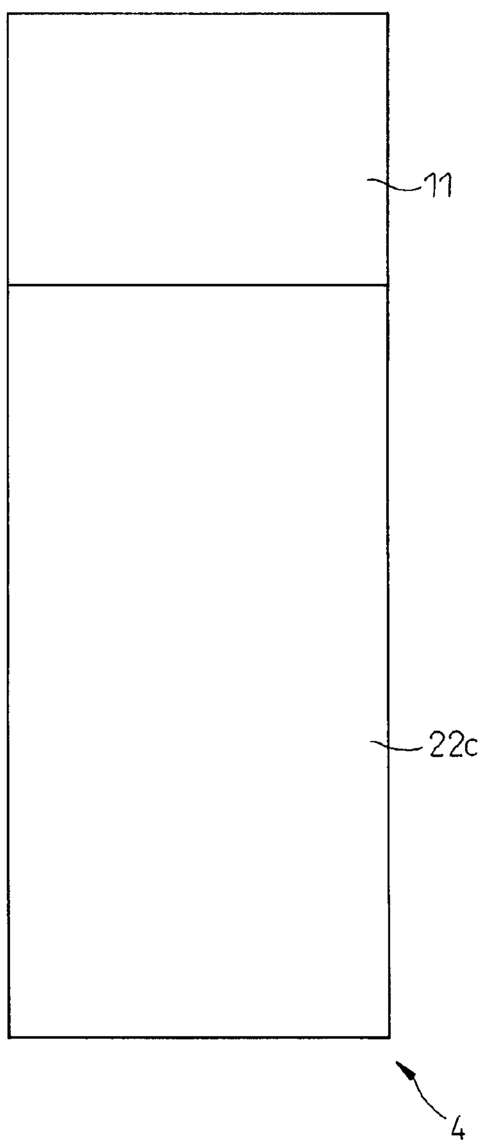
FIG. 11B is a back view of the antenna device according to the fourth embodiment.

FIG. 11A is a plan view, in schematic form, of an antenna device 4 according to a fourth embodiment in which the feed line is formed as a coplanar waveguide, and FIG. 11B is a back view of the antenna device 4. Four impedance matching elements 15*h*, 15*i*, 15*j*, and 15*k* are provided for connection to the feed line 24 of the antenna device 4 via switches 16*h*, 16*i*, 16*j*, and 16*k*, respectively. In FIGS. 11A and 11B, the various parts of the antenna device 4 are designated by the same reference numerals as those used to designate the corresponding component parts of the antenna device 3 depicted in FIG. 9. The antenna device 4 differs from the antenna device 3 in that the feed line 24 is formed as a coplanar waveguide.

In this embodiment, since the feed line 24 is formed as a coplanar waveguide, the ground electrode 22 is also formed on the same surface of the substrate 11, for example, the front surface of the substrate 11, on which the radiating electrode 13 and the feed line 24 are formed. The ground electrode 22 includes two ground electrodes 22*a* and 22*b* disposed so as to flank the feed line 24 on both sides. The ground electrode 22 further includes a ground electrode 22*c* which is formed on the back surface of the substrate 11 in the same manner as in the antenna device according to any other embodiment described herein. The ground electrodes 22*a* and 22*b* are connected to the ground electrode 22*c* via a plurality of through-holes formed in the substrate 11. The plurality of through-holes are arranged, for example, in a checkerboard pattern. In order to avoid adverse effects on the antenna characteristics, it is preferable to make the spacing between adjacent through-holes smaller than one half of the shortest radio signal wavelength to be handled by the antenna device 4, and more preferably smaller than one quarter of the shortest radio signal wavelength. For example, when the antenna device 4 is designed to handle the frequency range not higher than 6 GHz, it is preferable to make the spacing between adjacent through-holes smaller than 6.028 mm which is one quarter of the wavelength corresponding to 6 GHz.

In this embodiment, the substrate 11 is formed, for example, from a dielectric material having a relative permittivity of 4.3 and a dielectric loss tangent of 0.015. Further, the ground electrode 22, the radiating electrode 13, and the feed line 24 are each formed from a copper foil having a thickness of 35 μm. The width of the substrate 11 is, for example, 50 mm, and the height is 135 mm. The thickness of the substrate 11 is 1 mm. The ground electrodes 22*a* and 22*b* each have a width of 23.75 mm and a height of 100 mm. The width of the ground electrode 22*c* is 50 mm, and the height is 100 mm. The ground electrodes 22*a* and 22*b* are connected to the ground electrode 22*c* via the plurality of through-holes formed in the substrate 11. The plurality of through-holes are arranged in a checkerboard pattern, and the spacing between adjacent through-holes is 6.40 mm. The radius of the fan-shaped portion in the lower part of the radiating electrode 13 is 22.5 mm, and the rectangular portion in the upper part has a width of 25 mm and a height of 12 mm. The minimum spacing between the radiating electrode 13 and the ground electrode 22 is 0.5 mm. The width of the feed line 24 is chosen to be 1.5 mm so that the characteristic impedance of the feed line 24 becomes approximately equal to 50Ω. The spacing from the feed line 24 to each of the ground electrodes 22*a* and 22*b* is 0.5 mm.

In this embodiment also, the impedance matching elements 15*h*, 15*i*, 15*j*, and 15*k* are connected to the feed line 24 at positions that satisfy the earlier given equation (2) for respectively different frequencies. Further, each impedance matching element has the inductance defined in accordance with the earlier given equation (4).

The impedance matching elements 15*h*, 15*i*, 15*j*, and 15*k* are provided to make the radiating electrode 13 be impedance-matched, for example, at frequencies 1.4 GHz, 1.1 GHz, 0.75 GHz, and 0.7 GHz, respectively. For this purpose, the impedance matching elements 15*h*, 15*i*, 15*j*, and 15*k* are connected to the feed line 24 at positions 8.5 mm, 16.5 mm, 26.5 mm, and 33.5 mm respectively away from the feed point 13*a*. The impedance matching elements 15*h*, 15*i*, 15*j*, and 15*k* have inductances of 1.5 nH, 2.0 nH, 2.0 nH, and 1.2 nH, respectively.

Figure 12A:
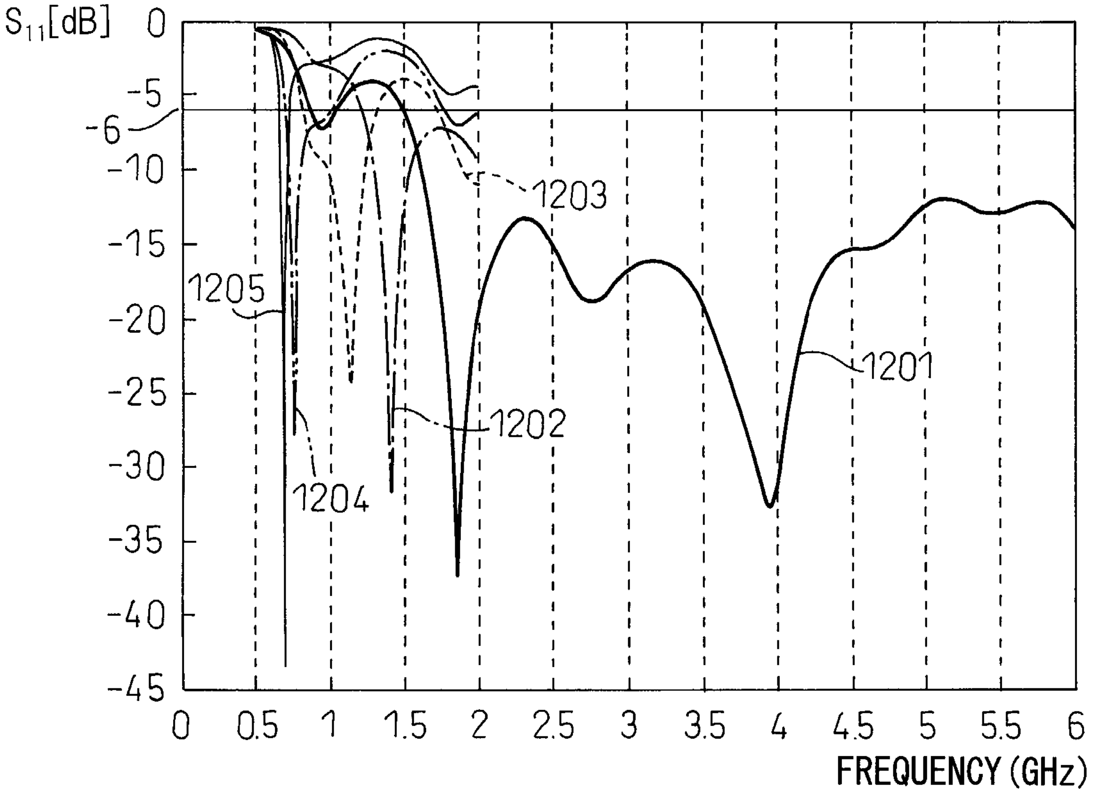
FIG. 12A is a diagram of graphs depicting the simulated values of the S11 parameter over the frequency range of 0.5 GHz to 6 GHz for the antenna device according to the fourth embodiment.
Figure 12B:
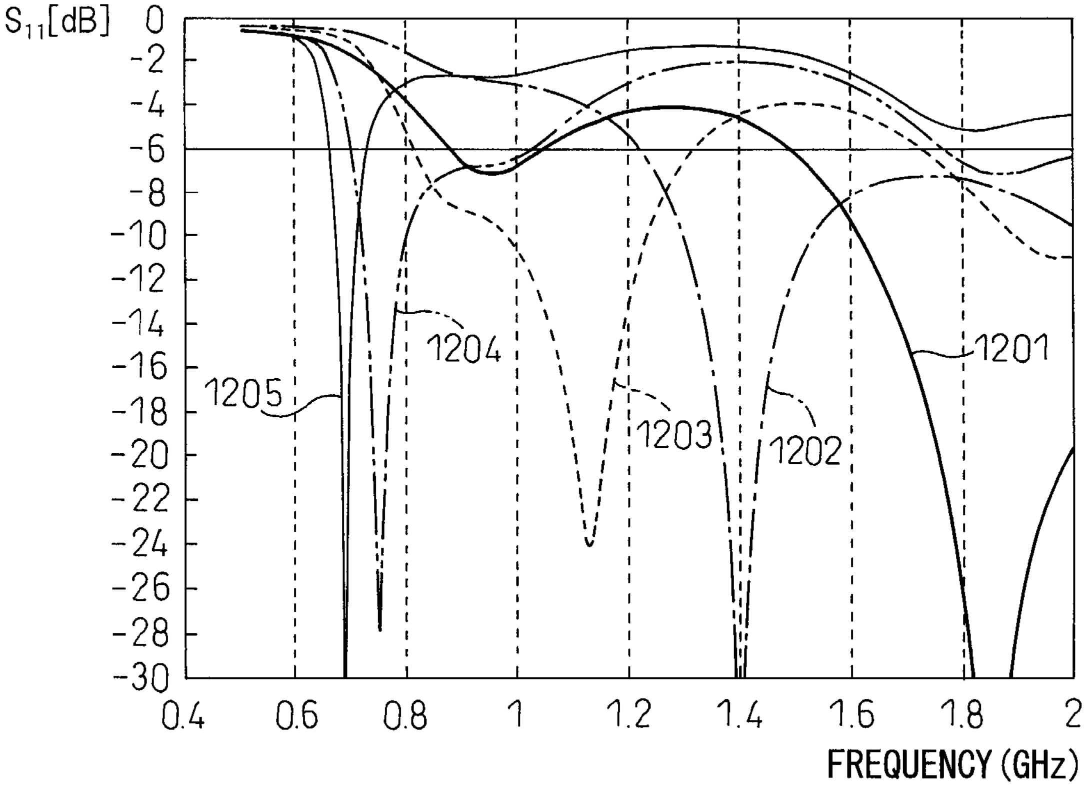
FIG. 12B is a diagram illustrating in enlarged form the graphs of FIG. 12A in the range of 0.5 GHz to 2 GHz.

FIGS. 12A and 12B illustrate the simulation results of the S11 parameter for explaining the antenna characteristics of the antenna device 4 according to the fourth embodiment. FIG. 12A is a diagram depicting the simulated values of the S11 parameter over the frequency range of 0.5 GHz to 6 GHz, and FIG. 12B is a diagram illustrating in enlarged form the graphs of FIG. 12A in the range of 0.5 GHz to 2 GHz.

In FIGS. 12A and 12B, the abscissa represents the frequency, and the ordinate represents the absolute value of the S11 parameter in decibels.

Graph 1201 depicts the simulated value of the S11 parameter when all the switches 16*h* to 16*k* were turned off to disconnect all the impedance matching elements 15*h* to 15*k* from the feed line 24. Graph 1202 depicts the simulated value of the S11 parameter when the switch 16*h* was turned on to connect the impedance matching element 15*h* to the feed line 24. Graph 1203 depicts the simulated value of the S11 parameter when the switch 16*i* was turned on to connect the impedance matching element 15*i* to the feed line 24. Graph 1204 depicts the simulated value of the S11 parameter when the switch 16*j* was turned on to connect the impedance matching element 15*j* to the feed line 24. Graph 1205 depicts the simulated value of the S11 parameter when the switch 16*k* was turned on to connect the impedance matching element 15*k* to the feed line 24. The simulated values depicted by the graphs 1201 to 1205 were calculated by electromagnetic field simulation using a finite integration method.

As depicted by the graph 1201, when none of the impedance matching elements 15*h* to 15*k* are connected to the feed line 24, the value of the S11 parameter is held below −6 dB in the frequency range of about 1.5 GHz to 6 GHz. On the other hand, as depicted by the graph 1202, when the impedance matching element 15*h* is connected to the feed line 24, the value of the S11 parameter is also held below −6 dB in the frequency range of about 1.2 GHz to about 1.8 GHz. Similarly, as depicted by the graph 1203, when the impedance matching element 15*i* is connected to the feed line 24, the value of the S11 parameter is also held below −6 dB in the frequency range of about 0.8 GHz to about 1.3 GHz. Further, as depicted by the graph 1204, when the impedance matching element **15*j* is connected to the feed line 24, the value of the S11 parameter is also held below −6 dB in the frequency range of about 0.7 GHz to about 1.0 GHz. Furthermore, as depicted by the graph 1205, when the impedance matching element 15*k* is connected to the feed line 24**, the value of the S11 parameter is also held below −6 dB in the frequency range of about 0.65 GHz to about 0.75 GHz.

In this way, by connecting one of the impedance matching elements **15*h* to 15*k* to the feed line 24 or disconnecting all the impedance matching elements from the feed line 24, the antenna device 4** can achieve good antenna characteristics over the frequency range of about 0.65 GHz to 6 GHz.

Figure 13:
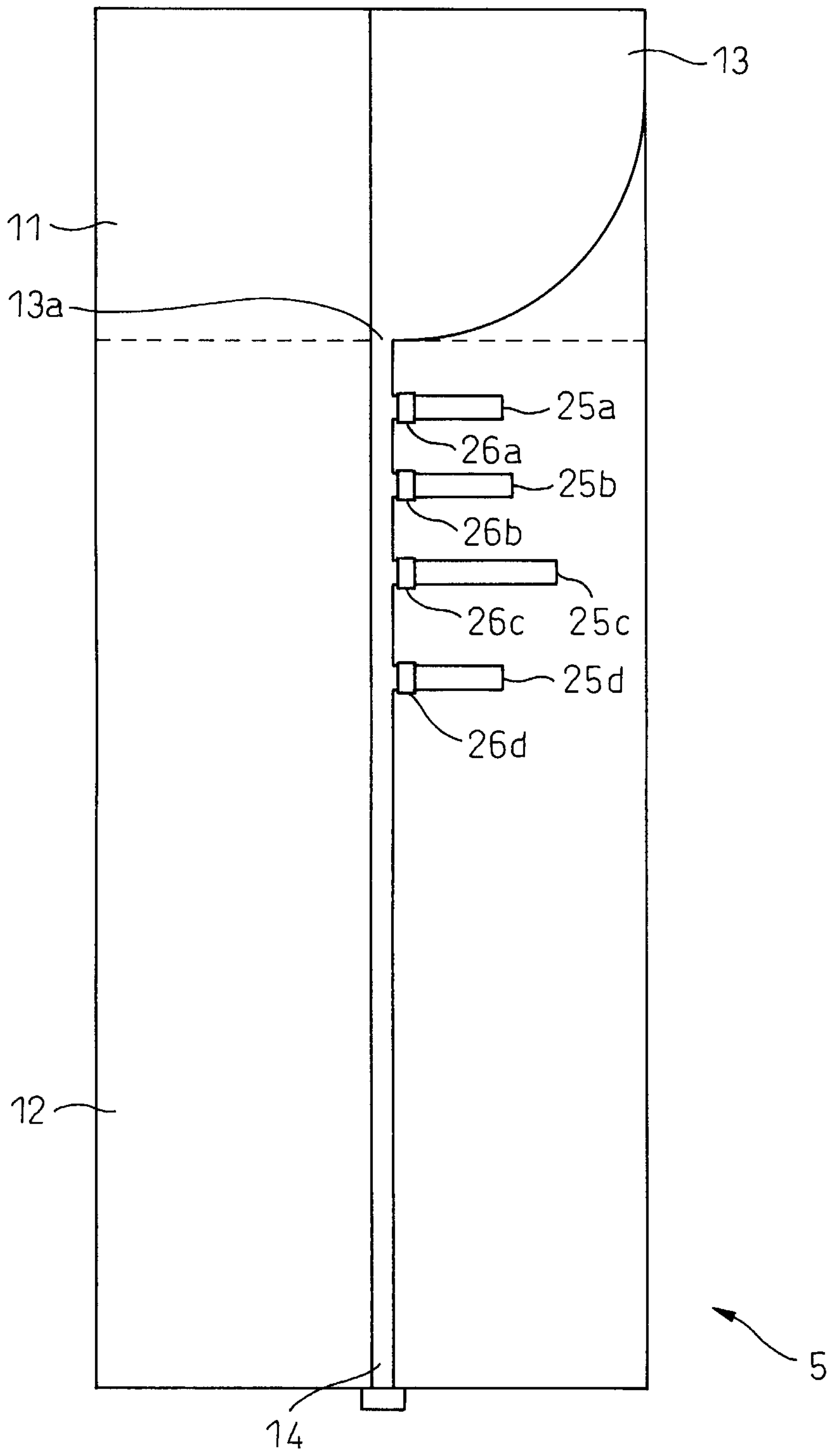
FIG. 13 is a transmissive plan view, in schematic form, of an antenna device according to a fifth embodiment.

FIG. 13 is a transmissive plan view, in schematic form, of an antenna device 5 according to a fifth embodiment in which each impedance matching element is a short stub. In FIG. 13, solid lines indicate the parts disposed on the front surface of the substrate 11, and dashed lines indicate the parts disposed on the back surface of the substrate 11. Four impedance matching elements **25*a*, 25*b*, 25*c*, and 25*d* are provided for connection to the feed line 14 of the antenna device 5 via switches 26*a*, 26*b*, 26*c*, and 26*d*, respectively. In FIG. 13, the various parts of the antenna device 5 are designated by the same reference numerals as those used to designate the corresponding component parts of the antenna device 3 depicted in FIG. 9. The antenna device 5 differs from the antenna device 3 in that the impedance matching elements to be connected to the feed line 14** are short stubs.

In this embodiment, the substrate 11 is formed, for example, from a dielectric material having a relative permittivity of 4.5 and a dielectric loss tangent of 0.011. Further, the ground electrode 12, the radiating electrode 13, the feed line 14, and the impedance matching elements **25*a* to 25*d* are each formed from a copper foil having a thickness of 35 μm. The width of the substrate 11 is, for example, 50 mm, and the height is 130 mm. The thickness of the substrate 11 is 1 mm. The width of the ground electrode 12 is 50 mm, and the height is 100 mm. The radius of the fan-shaped portion in the lower part of the radiating electrode 13 is 22.5 mm, and the rectangular portion in the upper part has a width of 25 mm and a height of 7 mm. The minimum spacing between the radiating electrode 13 and the ground electrode 12 is 0.5 mm. The width of the feed line 14 is chosen to be 1.8 mm so that the characteristic impedance of the feed line 14** becomes approximately equal to 50Ω.

In this embodiment also, the impedance matching elements **25*a*, 25*b*, 25*c*, and 25*d* are connected to the feed line 14** at positions that satisfy the earlier given equation (2) for respectively different frequencies. Further, each impedance matching element has the inductance defined in accordance with the earlier given equation (4).

The impedance matching elements **25*a*, 25*b*, 25*c*, and 25*d* are provided to make the radiating electrode 13 be impedance-matched, for example, at frequencies 1.5 GHz, 1.2 GHz, 0.8 GHz, and 0.72 GHz, respectively. For this purpose, the impedance matching elements 25*a*, 25*b*, 25*c*, and 25*d* are connected to the feed line 14 at positions 6 mm, 13 mm, 21 mm, and 30.5 mm respectively away from the feed point 13*a*. The impedance matching elements 25*a*, 25*b*, 25*c*, and 25*d* have inductances of 1.3 nH, 1.5 nH, 2.88 nH, and 1.88 nH, respectively. For this purpose, the impedance matching elements 25*a*, 25*b*, 25*c*, and 25*d* are respectively 10 mm, 11 mm, 15 mm, and 10 mm long in the horizontal direction, and are each 2 mm wide in the vertical direction. The impedance matching elements 25*a* to 25*d* are each connected at one end to an associated one of the switches 26*a* to 26*d* and at the other end to the ground electrode 12 via a cuboidal through-hole whose sides each measure 1 mm. The switches 26*a* to 26*d* are each connected to the feed line 14** via a copper foil having a width of 2 mm in the vertical direction, a length of 0.7 mm in the horizontal direction, and a thickness of 35 μm.

Figure 14A:
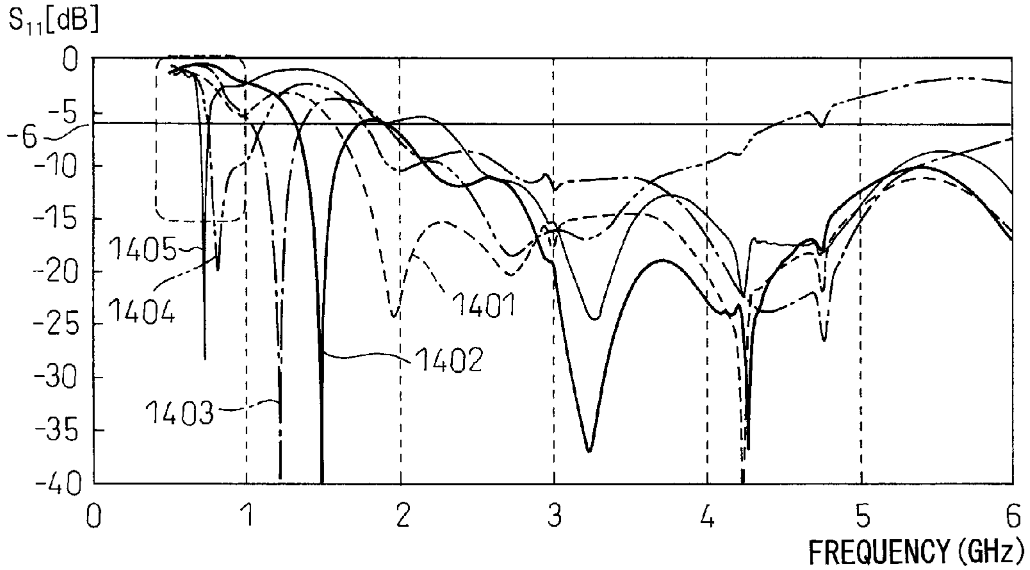
FIG. 14A is a diagram of graphs depicting the simulated values of the S11 parameter over the frequency range of 0.5 GHz to 6 GHz for the antenna device according to the fifth embodiment.
Figure 14B:
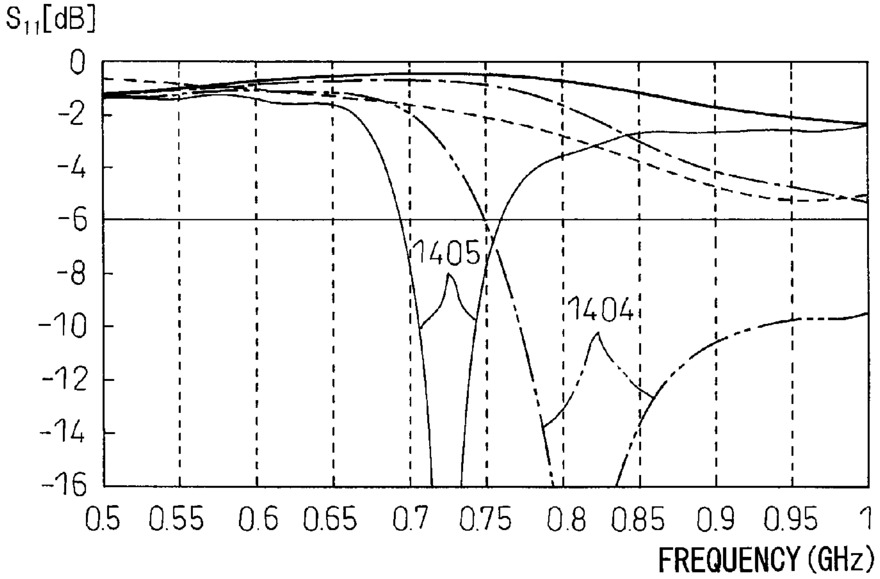
FIG. 14B is a diagram illustrating in enlarged form the graphs of FIG. 14A in the range of 0.5 GHz to 1 GHz.

FIGS. 14A and 14B illustrate the simulation results of the S11 parameter for explaining the antenna characteristics of the antenna device 5 according to the fifth embodiment. FIG. 14A is a diagram depicting the simulated values of the S11 parameter over the frequency range of 0.5 GHz to 6 GHz, and FIG. 14B is a diagram illustrating in enlarged form the graphs of FIG. 14A in the range of 0.5 GHz to 1 GHz.

In FIGS. 14A and 14B, the abscissa represents the frequency, and the ordinate represents the absolute value of the S11 parameter in decibels. Graph 1401 depicts the simulated value of the S11 parameter when all the switches **26*a* to 26*d* were turned off to disconnect all the impedance matching elements 25*a* to 25*d* from the feed line 14. Graph 1402 depicts the simulated value of the S11 parameter when the switch 26*a* was turned on to connect the impedance matching element 25*a* to the feed line 14. Graph 1403 depicts the simulated value of the S11 parameter when the switch 26*b* was turned on to connect the impedance matching element 25*b* to the feed line 14. Graph 1404 depicts the simulated value of the S11 parameter when the switch 26*c* was turned on to connect the impedance matching element 25*c* to the feed line 14. Graph 1405 depicts the simulated value of the S11 parameter when the switch 26*d* was turned on to connect the impedance matching element 25*d* to the feed line 14. The simulated values depicted by the graphs 1401 to 1405** were calculated by electromagnetic field simulation using a finite integration method.

As depicted by the graph 1401, when none of the impedance matching elements **25*a* to 25*d* are connected to the feed line 14, the value of the S11 parameter is held below −6 dB in the frequency range of about 1.6 GHz to 6 GHz. On the other hand, as depicted by the graph 1402, when the impedance matching element 25*a* is connected to the feed line 14, the value of the S11 parameter is also held below −6 dB in the frequency range of about 1.35 GHz to about 1.8 GHz. Similarly, as depicted by the graph 1403, when the impedance matching element 25*b* is connected to the feed line 14, the value of the S11 parameter is also held below −6 dB in the frequency range of about 1.1 GHz to about 1.35 GHz. Further, as depicted by the graph 1404, when the impedance matching element 25*c* is connected to the feed line 14, the value of the S11 parameter is also held below −6 dB in the frequency range of about 0.75 GHz to about 1.1 GHz. Furthermore, as depicted by the graph 1405, when the impedance matching element 25*d* is connected to the feed line 14**, the value of the S11 parameter is also held below −6 dB in the frequency range of about 0.69 GHz to about 0.76 GHz.

In this way, by connecting one of the impedance matching elements **25*a* to 25*d* to the feed line 14 or disconnecting all the impedance matching elements from the feed line 14, the antenna device 5** can achieve good antenna characteristics over the frequency range of about 0.69 GHz to 6 GHz.

Next, an antenna device according to a sixth embodiment will be described. In the antenna device according to the sixth embodiment, the feed line includes a plurality of sub-feed lines connected in parallel between the radiating electrode and the impedance matching element and each serving as a distributed constant transmission line. By connecting a selected one of the plurality of sub-feed lines to the radiating electrode and the impedance matching element via switches, the radiating electrode is impedance-matched at a particular frequency. With this configuration, the antenna device according to the sixth embodiment can be constructed from fewer parts than the antenna device according to the second embodiment.

Figure 15:
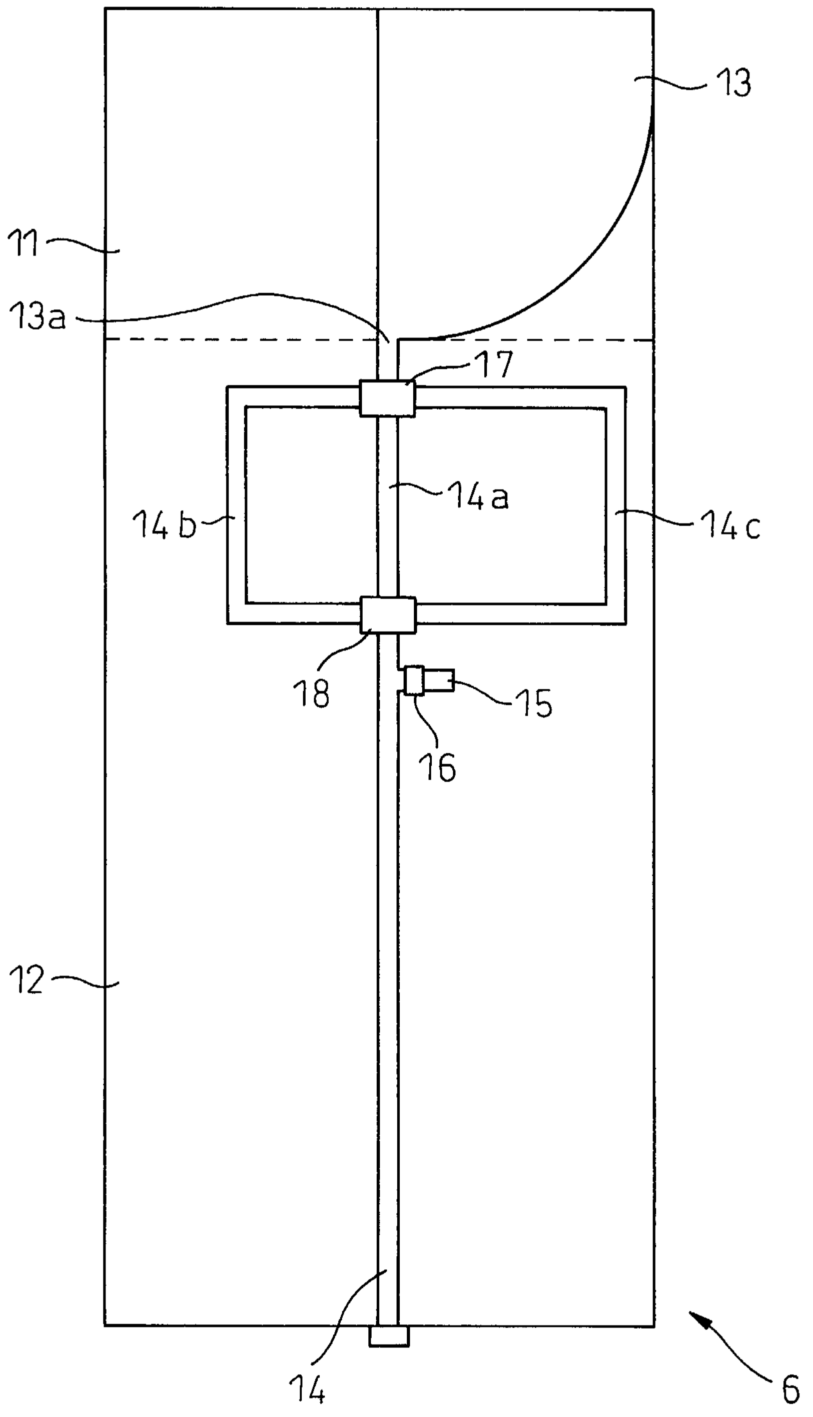
FIG. 15 is a transmissive plan view, in schematic form, of an antenna device according to a sixth embodiment.
Figure 16:
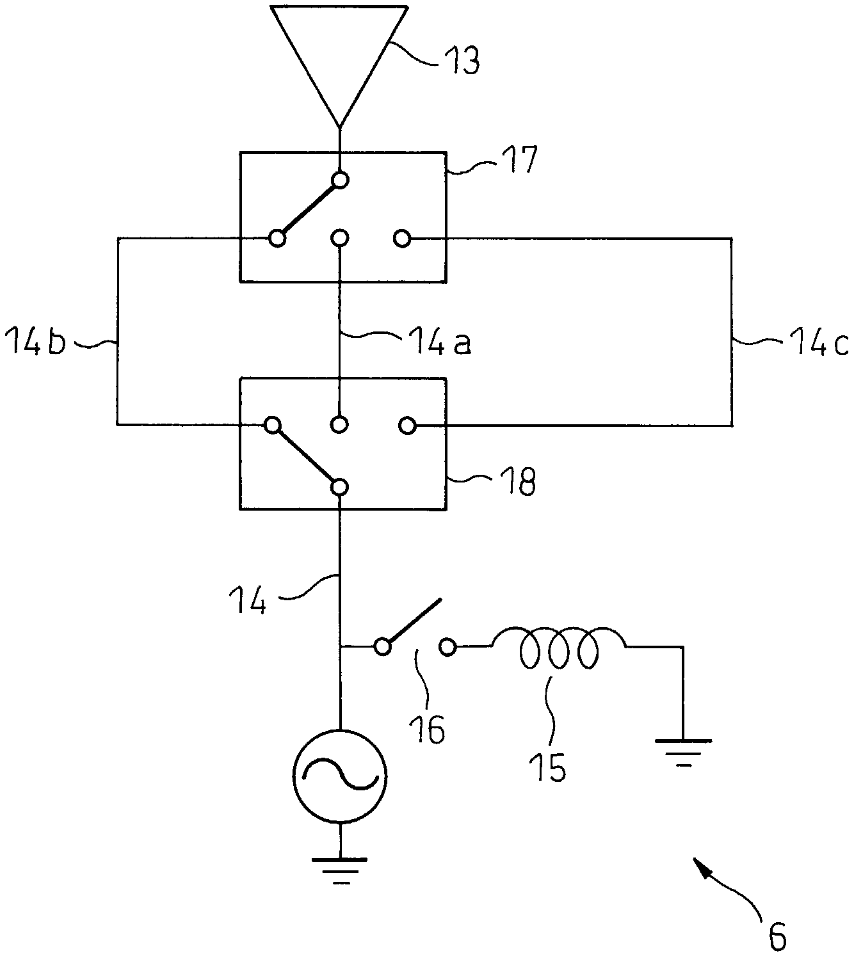
FIG. 16 is a circuit diagram of the antenna device according to the sixth embodiment.

FIG. 15 is a transmissive plan view, in schematic form, of the antenna device 6 according to the sixth embodiment, and FIG. 16 is a circuit diagram of the antenna device 6. As depicted in FIGS. 15 and 16, the feed line 14 of the antenna device 6 includes three sub-feed lines 14*a*, 14*b*, and 14*c* having different lengths. A single-pole, n-throw (SPNT) switch 17 is interposed between the feed point 13*a* and the sub-feed lines 14*a* to 14*c*. Similarly, a SPNT switch 18 is interposed between the end portion of the switch 16 at which the switch 16 is connected to the feed line 14 and the sub-feed lines 14*a* to 14*c*. In FIGS. 15 and 16, the various parts of the antenna device 6 are designated by the same reference numerals as those used to designate the corresponding component parts of the antenna device 1 depicted in FIGS. 1 and 2. The antenna device 6 differs from the antenna device 1 in that the feed line 14 includes a plurality of sub-feed lines a selected one of which is connected to the radiating electrode and the impedance matching element via the two SPNT switches, respectively.

The SPNT switches 17 and 18 operate to select one of the sub-feed lines 14*a* to 14*c* in accordance with a control signal from a control circuit not depicted, and to electrically connect the selected one to the radiating electrode 13, to the switch 16, and to a communication circuit (not depicted) connected as a signal wave source to the lower end of the feed line 14. Then, the antenna device 6 transfers the transmit signal received from the communication circuit on to the radiating electrode 13 via the sub-feed line connected to the radiating electrode 13 and the switch 16. Further, the antenna device 6 transfers the radio signal received by the radiating electrode 13 on to the communication circuit via the sub-feed line connected to the radiating electrode 13 and the switch 16.

The SPNT switches 17 and 18 can be, for example, MEMS (Micro Electro Mechanical Systems) switches.

Each of the sub-feed lines 14*a* to 14*c* is formed as a distributed constant transmission line in order to impedance-match the radiating electrode 13 in cooperation with the impedance matching element 15. In the present embodiment, each of the sub-feed lines 14*a* to 14*c* and the ground electrode 12 formed on the back surface of the substrate 11 together form a microstrip line.

By selectively connecting the sub-feed lines 14*a* to 14*c* to the radiating electrode 13 and also to the impedance matching element 15 via the switch 16, the radiating electrode 13 is impedance-matched over various different frequencies. For this purpose, each of the sub-feed lines 14*a* to 14*c* has a length such that the distance between the impedance matching element 15 and the feed point 13*a* satisfies the earlier given equation (2) for the frequency of the radio signal corresponding to that sub-feed line. The impedance matching element 15, when connected to any one of the sub-feed lines 14*a* to 14*c*, has inductance that satisfies the equation (4).

In the present embodiment also, the ground electrode 12, the radiating electrode 13, and the feed line 14 including the sub-feed lines 14*a* to 14*c* are each formed from a conductor such as copper, gold, or iron. The ground electrode 12, the radiating electrode 13, and the feed line 14 are formed on the substrate 11, for example, by etching or photolithography.

Figure 17:
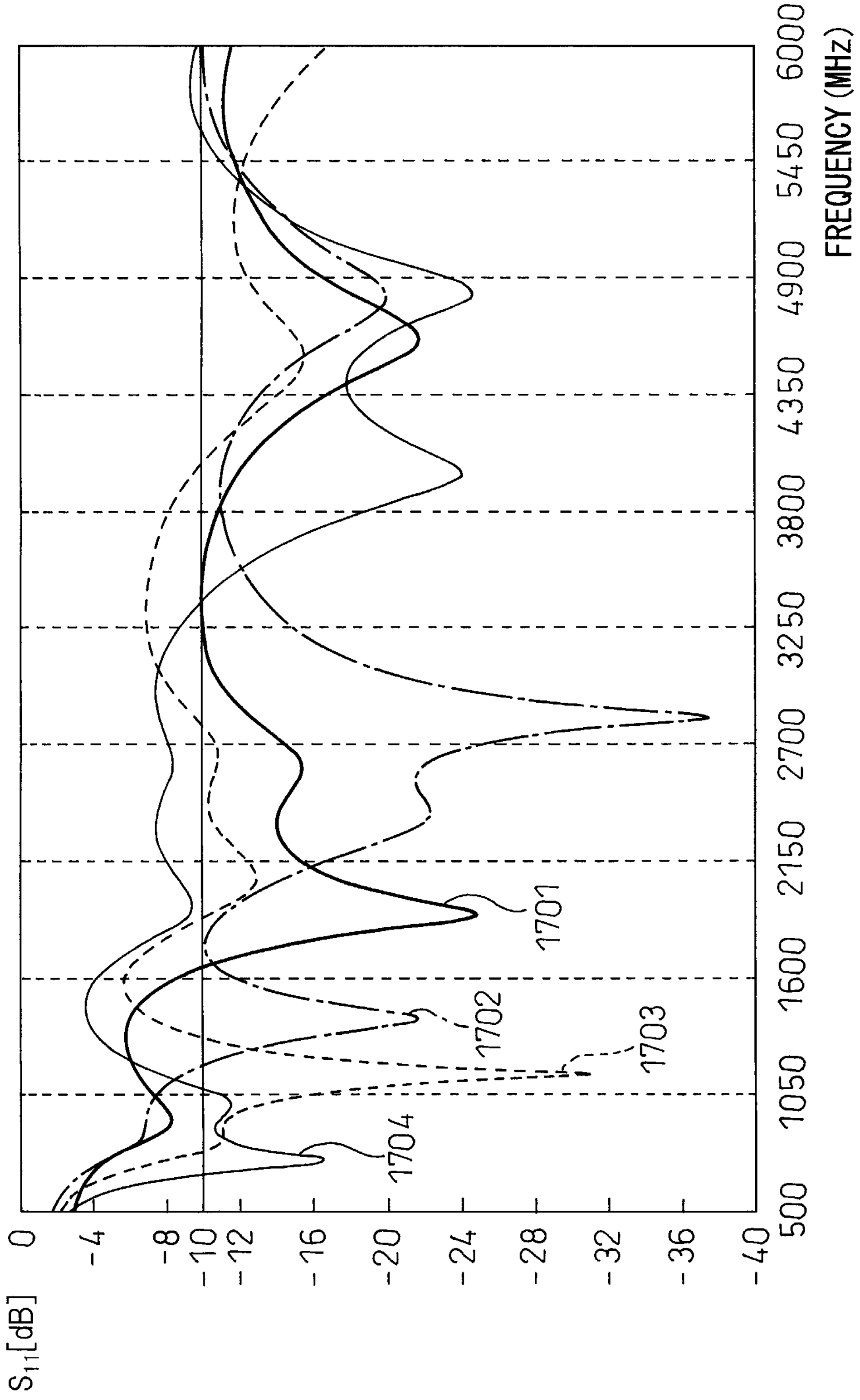
FIG. 17 is a diagram of graphs depicting the simulation results of the S11 parameter for radio frequencies in the range of 0.5 GHz to 6 GHz for explaining the antenna characteristics of the antenna device according to the sixth embodiment.

FIG. 17 illustrates the simulation results of the S11 parameter in order to explain the antenna characteristics for one example of the antenna device 6 according to the sixth embodiment. In this example, each part of the antenna device 6 is formed from the same material as the corresponding part of the antenna device 1 depicted in FIG. 4. The substrate 11, the ground electrode 12, and the radiating electrode 13 each have a similar shape, size, and configuration as those of the substrate, the ground electrode, and the radiating electrode in the third embodiment illustrated in FIG. 9. Further, the sub-feed lines 14*a* to 14*c* located between the SPNT switches 17 and 18 and the other portions of the feed line 14 each have a width of 1.8 mm so that the characteristic impedance becomes 50Ω.

The sub-feed lines 14*a* to 14*c* are formed so as to provide lengths of 5 mm, 13 mm, and 21 mm, respectively, as measured from the feed point 13*a* to the impedance matching element 15, in order to make the radiating electrode 13 be impedance-matched, for example, at frequencies 1.4 GHz, 1.15 GHz, and 0.75 GHz, respectively. The impedance matching element 15 has an inductance of 6 nH.

In FIG. 17, the abscissa represents the frequency, and the ordinate represents the absolute value of the S11 parameter in decibels. Graph 1701 depicts the simulated value of the S11 parameter when the switch 16 was turned off to disconnect the impedance matching element 15 from the feed line 14 and when the SPNT switches 17 and 18 selected the sub-feed line 14*a* for connection to the radiating electrode 13. Graphs 1702 to 1704 each depict the simulated value of the S11 parameter when the switch 16 was turned on to connect the impedance matching element 15 to the feed line 14. Specifically, graph 1702 depicts the simulated value of the S11 parameter when the sub-feed line 14*a* was connected to the radiating electrode 13 and the impedance matching element 15 via the SPNT switches 17 and 18, respectively. Graph 1703 depicts the simulated value of the S11 parameter when the sub-feed line 14*b* was connected to the radiating electrode 13 and the impedance matching element 15 via the SPNT switches 17 and 18, respectively. Graph 1704 depicts the simulated value of the S11 parameter when the sub-feed line 14*c* was connected to the radiating electrode 13 and the impedance matching element 15 via the SPNT switches 17 and 18, respectively. The simulated values depicted by the graphs 1701 and 1704 were calculated by electromagnetic field simulation using a finite integration method.

As depicted by graph 1701, when the impedance matching element 15 is disconnected from the feed line 14, and the sub-feed line 14*a* is connected to the radiating electrode 13, the value of the S11 parameter is held below −10 dB in the frequency range of about 1.7 GHz to 6 GHz. On the other hand, as depicted by graph 1702, when the impedance matching element 15 is connected to the feed line 14 and then connected to the radiating electrode 13 via the shortest sub-feed line 14*a*, the value of the S11 parameter is also held below −10 dB in the frequency range of about 1.2 GHz to about 1.75 GHz. Similarly, as depicted by graph 1703, when the impedance matching element 15 is connected to the feed line 14 and then connected to the radiating electrode 13 via the sub-feed line 14*b*, the value of the S11 parameter is also held below −10 dB in the frequency range of about 0.8 GHz to about 1.3 GHz. Further, as depicted by graph 1704, when the impedance matching element 15 is connected to the feed line 14 and then connected to the radiating electrode 13 via the longest sub-feed line 14*c*, the value of the S11 parameter is also held below −10 dB in the frequency range of about 0.65 GHz to about 1.1 GHz.

In this way, by switching among the sub-feed lines to connect between the radiating electrode 13 and the impedance matching element 15, the antenna device 6 can maintain good antenna characteristics over the frequency range of about 0.65 GHz to 6 GHz.

As described above, the antenna device 6 according to the sixth embodiment includes a plurality of sub-feed lines having different lengths and each serving as a distributed constant transmission line. Then, the radiating electrode is impedance-matched at the frequency of the radio signal by selecting one of the plurality of sub-feed lines for connection between the radiating electrode and the impedance matching element. In this way, the antenna device can maintain good antenna characteristics over a wide frequency range, for example, over the entire frequency range of about 0.65 GHz to 6 GHz.

Furthermore, since the radiating electrode can be impedance-matched over such a wide frequency range by using only one impedance matching element, the antenna device can reduce the number of parts needed. For example, compared with the antenna device according to the second embodiment, the antenna device of the present embodiment can reduce the number of impedance matching elements by two. Further, compared with the antenna device according to the third embodiment that achieves good antenna characteristics over a wider frequency range than the antenna device according to the second embodiment, the antenna device of the present embodiment can reduce the number of impedance matching elements by three and the number of switches by one.

In the antenna device of the sixth embodiment, the number of sub-feed lines is not limited to three. As the number of sub-feed lines having different lengths becomes larger, the antenna device can achieve good antenna characteristics over a wider frequency range.

According to one modified example, the antenna device may include a plurality of impedance matching elements, with provisions made to selectively connect one of them to the feed line 14 so as to be in parallel with the radiating electrode 13. In this case also, the impedance matching elements respectively have inductances that satisfy the equation (4) for radio signals having different frequencies. The antenna device of this example can achieve good antenna characteristics over a wider frequency range than the antenna device having only one impedance matching element can. In this case, a SPNT switch is used as the switch for selectively connecting one of the plurality of impedance matching elements to the feed line. As a result, if the number of impedance matching elements is increased, the number of switches remains the same at three.

According to another modified example, the impedance matching element may be permanently connected to the feed line. In this case, the number of parts of the antenna device can be further reduced, because the switch for connecting the impedance matching element to the feed line is eliminated. In this case also, the radiating electrode is impedance-matched at the frequency corresponding to the sub-feed line connected to the radiating electrode and the impedance matching element.

Each sub-feed line may be formed as a strip line or a coplanar waveguide. When the sub-feed lines are formed as coplanar waveguides, a plurality of ground electrodes are formed on the front surface of the substrate, on which the sub-feed lines are formed, in such a manner as to sandwich the respective sub-feed lines. Then, the ground electrodes are connected together, for example, through via holes formed in the substrate and conductors formed on the back surface of the substrate, so as to have the same ground voltage.

Next, a communication device incorporating an antenna device according to any one of the above embodiments will be described.

Figure 18:
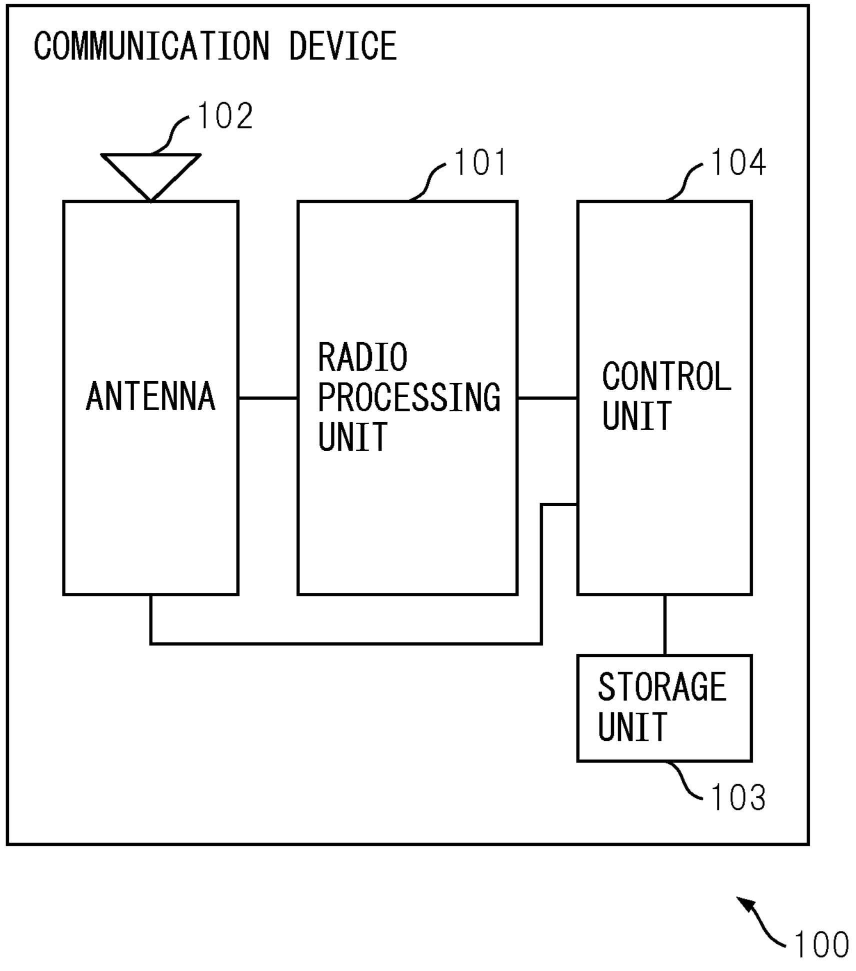
FIG. 18 is a schematic diagram illustrating the configuration of a communication device incorporating an antenna device according to any one of the above embodiments.

FIG. 18 is a schematic diagram illustrating the configuration of a communication device 100. The communication device 100 includes a radio processing unit 101, an antenna 102, a storage unit 103, and a control unit 104. The radio processing unit 101, the storage unit 103, and the control unit 104 are each implemented as a separate circuit. Alternatively, these units may be mounted in the communication device by implementing them in the form of a single integrated circuit on which the respective circuits are integrated.

The radio processing unit 101, in accordance with a prescribed scheme, modulates and multiplexes the transmit signal received from the control unit 104. The prescribed modulation/multiplexing scheme here can be, for example, a single carrier frequency division multiplexing (SC-FDMA) scheme.

The radio processing unit 101 superimposes the multiplexed and modulated signal on a carrier having a radio frequency specified by the control unit 104. Then, the radio processing unit 101 amplifies the signal superimposed on the carrier to a desired level by a high-power amplifier (not depicted), and sends the signal to the antenna 102.

When a signal is received via the antenna 102, the radio processing unit 101 amplifies the received signal by a low-noise amplifier (not depicted). When the thus amplified received signal has a radio frequency specified by the control unit 104, the radio processing unit 101 multiplies the signal by a periodic signal having an intermediate frequency and thereby converts the frequency of the received signal from the radio frequency to the baseband frequency. Then, the radio processing unit 101 demultiplexes the received signal in accordance with a prescribed multiplexing scheme, and demodulates the demultiplexed signal. The radio processing unit 101 supplies the demodulated signal to the control unit 104. The multiplexing scheme for the received signal here can be, for example, an orthogonal frequency-division multiplexing (OFDM) scheme.

The antenna 102 is an antenna device according to any one of the above embodiments. The signal transferred from the radio processing unit 101 is radiated from the antenna 102. When a signal transmitted from a remote communication device is received, the antenna 102 passes the received signal to the radio processing unit 101.

The antenna 102, for example, like the antenna device according to any one of the first to fifth embodiments, includes at least one impedance matching element and a switch for connecting and disconnecting the impedance matching element to and from the feed line. The antenna 102 turns on one of such switches or turns off all of the switches in accordance with the control signal received from the control unit 104. By connecting to the feed line, or disconnecting from the feed line, the impedance matching element corresponding to the carrier frequency of the transmit signal or the received signal, the antenna 102 matches the impedance of the radiating electrode to that of another circuit connected to the antenna 102.

Like the antenna device according to the sixth embodiment, for example, the antenna 102 may include a plurality of sub-feed lines and two SPNT switches for connecting a selected one of the plurality of sub-feed lines to the radiating electrode. In this case, the antenna 102 connects the radiating electrode of the antenna 102 to the radio processing unit 101 via the selected sub-feed line in accordance with the control signal received from the control unit 104.

The storage unit 103 includes, for example, a rewritable nonvolatile semiconductor memory. The storage unit 103 stores various kinds of information used to control communications with other communication devices. For example, the storage unit 103 stores a reference table that provides mapping between each of a plurality of frequency bands and the switch to be turned on from among one or more switches that are disposed between the corresponding impedance matching element(s) and the feed line and that the antenna 102 has for the respective frequency bands.

Table 1 below is one example of such a reference table.

TABLE 1

| Frequency band (GHz) | Switch identification number |
|---|---|
| 0.7-0.8 | 4 |
| 0.8-1.0 | 3 |
| 1.1-1.3 | 2 |
| 1.3-1.8 | 1 |
| 1.4-6 | 0 |

In Table 1, each entry in the left-hand column indicates a frequency band, and each entry in the right-hand column indicates the identification number of the switch to be turned on for the frequency band indicated in the corresponding entry in the left-hand column. For example, when the antenna device 3 according to the third embodiment is used as the antenna 102, the switch identification numbers "1" to "4" designate the switches 16*d* to 16*g*, respectively. When all the switches are to be turned off, the switch identification number is, for example, "0".

When the antenna device 6 according to the sixth embodiment is used as the antenna 102, the reference table provides mapping between the frequency band used and the identification number of the sub-feed line to be connected to the radiating electrode as well as the setting of the switch for connecting the impedance matching element to the feed line.

Alternatively, the reference table may provide mapping between the identification number of the communication application to be executed on the communication device 100 and the switch to be turned on for the frequency band used by the communication application or the sub-feed line to be connected to the radiating electrode.

The control unit 104 performs processing for connecting the communication device 100 via radio to a remote communication device. For example, when the communication device 100 is a mobile device such as a mobile phone in a mobile communication system, the control unit 104 performs processing such as location registration, call control, handover, transmit power control, etc. Then, the control unit 104 generates a control signal for establishing a radio connection between the communication device 100 and the remote communication device. Further, the control unit 104 performs processing in response to a control signal received from the remote communication device.

The control unit 104 creates transmit data that contains, for example, an audio signal or a data signal acquired via a microphone (not depicted) or via a user interface (not depicted) such as a keypad. Then, the control unit 104 applies information source coding to the transmit data. Further, the control unit creates a transmit signal containing the transmit data and a control signal, and performs transmission processing such as error-correction coding. The control unit 104 supplies the thus processed transmit signal to the radio processing unit 101. When a signal is received from the remote communication unit connected at the other end of the radio link, the radio processing unit 101 demodulates the received signal, and the control unit 104 applies reception processing, such as error-correction decoding and information source decoding, to the demodulated signal. The control unit 104 then retrieves an audio signal or a data signal from the demodulated signal. The control unit 104 performs control to reproduce the retrieved audio signal through a speaker (not depicted) or display the data signal on a display (not depicted).

The control unit 104 specifies the frequency band to use for communication with the remote communication unit, based on an operation signal entered via the user interface not depicted or on a command issued from the communication application being executed on the control unit 104. Then, the control unit 104 refers to the reference table stored in the storage unit 103, and locates the identification number of the switch that the antenna 102 uses for that specified frequency band. The control unit 104 then creates a control signal for instructing the antenna 102 to turn on the specified switch or a control signal for specifying the sub-feed line to be connected, and sends the control signal to the antenna 102.

For example, when the communication device 100 is going to communicate with a base station in accordance with the LTE standard by using the 0.7-GHz band, the control unit 104 decides, for example, by referring to the reference table depicted in Table 1, that the switch specified by the identification number "4" that corresponds to 0.7 GHz is to be turned on. Then, the control unit 104 creates a control signal for turning on the switch specified by the identification number "4".

On the other hand, when the communication device 100 is going to receive a GPS signal that uses a frequency band of 1.56 to 1.58 GHz, the control unit 104 decides, for example, by referring to the reference table depicted in Table 1, that the switch specified by the identification number "1" is to be turned on. Then, the control unit 104 creates a control signal for turning on the switch specified by the identification number "1".

Here, if the reference table provides mapping between the identification number of the communication application and the switch to be turned on, the control unit 104 identifies the switch to be turned on, by referring to the reference table based on the identification number of the communication application used.

The control unit 104 sends the thus created control signal to the antenna 102. Then, after the specified switch has been turned on and the other switches off in the antenna 102, the control unit 104 starts communication with the remote communication unit by using the designated frequency band.

By thus controlling the antenna 102 so as to achieve good antenna characteristics for the frequency band used for the communication, the communication device 100 can execute various communication applications by using only one antenna 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. An antenna device comprising:

a substrate;

a radiating electrode formed on said substrate;

a ground electrode formed on said substrate and disposed opposite said radiating electrode;

a feed line as a distributed constant transmission line connected via a feed point positioned at one end of said feed line to said radiating electrode;

an impedance matching element for impedance-matching said radiating electrode at a prescribed signal frequency by being connected in parallel with said radiating electrode to said feed line at a position a prescribed distance away from said feed point; and a switch, interposed between said impedance matching element and said feed line, for connecting or disconnecting said impedance matching element to or from said feed line in accordance with a prescribed control signal, wherein one end of said impedance matching element is connected to said switch and the other end of said impedance matching element is connected to said ground electrode, and wherein the other end of said feed line is connected to a communication circuit, and wherein said prescribed distance is determined so that when said impedance matching element is connected to said feed line, combined conductance of said radiating electrode and said feed line becomes equal to the conductance of the communication circuit, and wherein said prescribed distance is determined by equation $$1 = \frac{1}{\beta}\tan^{-1}\left[\frac{-X_{f0}Z_0 \pm \sqrt{(X_{f0}Z_0)^2 - (Z_0^2 - R_{f0}Z_0)(X_{f0}^2 + R_{f0}^2 - Z_0R_{f0})}}{Z_0^2 - R_{f0}Z_0}\right] \quad (1)$$

$$\beta = \frac{2\pi}{\lambda_{eff}}$$

where I represents said prescribed distance, $f_0$ represents said prescribed signal frequency, $R_{f0}$ represents a real component of the impedance that said radiating electrode has at said prescribed signal frequency, $X_{f0}$ represents an imaginary component of the impedance that said radiating electrode has at said prescribed signal frequency, $Z_0$ represents the characteristic impedance of said feed line, $\lambda_{eff}$ represents the wavelength of a signal having said prescribed signal frequency, as computed by considering wavelength shortening due to the material of said substrate, and β is a phase constant.

2. The antenna device according to claim 1, wherein only said feed line is interposed between said feed point and said switch.

3. The antenna device according to claim 1, wherein said impedance matching element has an inductance that compensates so as to cancel out a susceptance component that said radiating electrode and said feed line have when said impedance matching element is connected to said feed line.

4. The antenna device according to claim 3, wherein the inductance that said impedance matching element has is determined by equation $$L_{ind} = \frac{1}{2\pi f_0 B_i} \quad (2)$$

$$B_i = -\frac{1}{Z_0}\frac{j(X_{f0}Z_0 + (Z_0^2 - R_{f0}^2 - X_{f0}^2)\tan\beta l - X_{f0}Z_0\tan^2\beta l)}{R_{f0}^2 + (X_{f0} + Z_0\tan\beta l)^2}$$

-continued $$\beta = \frac{2\pi}{\lambda_{eff}}$$

where $L_{ind}$ represents the inductance that said impedance matching element has, $f_0$ represents said prescribed signal frequency, $B_i$ represents the susceptance component that said radiating electrode and said feed line have, I represents said prescribed distance, $R_{f0}$ represents a real component of the impedance that said radiating electrode has for said prescribed signal frequency, $X_{f0}$ represents an imaginary component of the impedance that said radiating electrode has for said prescribed signal frequency, $Z_0$ represents the characteristic impedance of said feed line, $\lambda_{eff}$ represents the wavelength of a signal having said prescribed signal frequency, as computed by considering wavelength shortening due to the material of said substrate, and β is a phase constant.

5. The antenna device according to claim 1, further comprising:

a second impedance matching element for impedance-matching said radiating electrode at a second signal frequency, which is different from said prescribed signal frequency, by being connected in parallel with said radiating electrode to said feed line at a position a second prescribed distance away from said feed point; and a second switch, interposed between said second impedance matching element and said feed line, for connecting or disconnecting said second impedance matching element to or from said feed line in accordance with a prescribed control signal, and wherein one end of said second impedance matching element is connected to said second switch and the other end of said second impedance matching element is connected to said ground electrode, and wherein only one or the other of said impedance matching element or said second impedance matching element is connected to said feed line or both are disconnected from said feed line.

6. The antenna device according to claim 1, wherein said feed line includes a first sub-feed line and a second sub-feed line as distributed constant transmission lines connected in parallel between said feed point and said switch, said antenna device further comprising:

a second switch, interposed between one end of each of said first and second sub-feed lines and said feed point, for connecting said first sub-feed line or said second sub-feed line to said radiating electrode in accordance with a second control signal; and a third switch, interposed between the other end of each of said first and second sub-feed lines and said switch, for connecting to said switch either said first sub-feed line or said second sub-feed line, whichever is connected to said radiating electrode by said second switch in accordance with said second control signal, and wherein said first sub-feed line has a length that impedance-matches said radiating electrode at said prescribed signal frequency when said first sub-feed line is connected both to said radiating electrode and to said impedance matching element via said switch, and said second sub-feed line has a length that impedance-matches said radiating electrode at third signal frequency when said second sub-feed line is connected both to said radiating electrode and to said impedance matching element via said switch.

7. The antenna device according to claim 6, further comprising a third impedance matching element, connected to said switch so as to be in parallel with said impedance matching element, for impedance-matching said radiating electrode at a fourth signal frequency, and wherein said switch connects said impedance matching element to said feed line when said antenna device transmits or receives a signal having said prescribed signal frequency, and connects said third impedance matching element to said feed line when said antenna device transmits or receives a signal having said fourth signal frequency.

8. An antenna device comprising:

a substrate;

a radiating electrode formed on said substrate;

a ground electrode formed on said substrate and disposed opposite said radiating electrode;

a feed line connected via a feed point to said radiating electrode and having a plurality of sub-feed lines as distributed constant transmission lines connected in parallel at one end to said feed point, wherein said plurality of sub-feed lines have different lengths from each other that impedance-match said radiating electrode at different signal frequencies;

an impedance matching element connected in parallel to each of said plurality of sub-feed lines at the other end thereof;

a first switch, interposed between said feed point and one end of each of said plurality of sub-feed lines, for connecting one of said plurality of sub-feed lines to said radiating electrode in accordance with a prescribed control signal; and a second switch, interposed between said impedance matching element and the other end of each of said plurality of sub-feed lines, for connecting to said impedance matching element one of said plurality of sub-feed lines that is connected to said radiating electrode by said first switch in accordance with said prescribed control signal, and wherein wherein said prescribed distance is determined so that when said impedance matching element is connected to said feed line, combined conductance of said radiating electrode and said feed line becomes equal to the conductance of the communication circuit, and wherein said prescribed distance is determined by equation $$l = \frac{1}{\beta}\tan^{-1}\left[\frac{-X_{f0}Z_0 \pm \sqrt{(X_{f0}Z_0)^2 - (Z_0^2 - R_{f0}Z_0)(X_{f0}^2 + R_{f0}^2 - Z_0R_{f0})}}{Z_0^2 - R_{f0}Z_0}\right] \quad (1)$$

$$\beta = \frac{2\pi}{\lambda_{eff}}$$

where l represents said prescribed distance, $f_0$ represents said prescribed signal frequency, $R_{f0}$ represents a real component of the impedance that said radiating electrode has at said prescribed signal frequency, $X_{f0}$ represents an imaginary component of the impedance that said radiating electrode has at said prescribed signal frequency, $Z_0$ represents the characteristic impedance of said feed line, $\lambda_{eff}$ represents the wavelength of a signal having said prescribed signal frequency, as computed by considering wavelength shortening due to the material of said substrate, and β is a phase constant.

9. A communication device comprising:

an antenna which comprises a substrate, a radiating electrode formed on said substrate, a ground electrode formed on said substrate and disposed opposite said radiating electrode, a feed line as a distributed constant transmission line connected via a feed point positioned at one end of said feed line to said radiating electrode, an impedance matching element for impedance-matching said radiating electrode at prescribed signal frequency by being connected in parallel with said radiating electrode to said feed line at a position a prescribed distance away from said feed point, and a switch, interposed between said impedance matching element and said feed line, for connecting or disconnecting said impedance matching element to or from said feed line;

a control unit which generates a control signal for determining whether or not to operate said switch to connect said impedance matching element to said feed line in accordance with a frequency band used by a communication application, and which sends said control signal to said antenna; and a radio processing unit which receives via said antenna a signal having a frequency falling within the frequency band used by said communication application, and which demodulates said received signal, wherein one end of said impedance matching element is connected to said switch and the other end of said impedance matching element is connected to said ground electrode, and wherein the other end of said feed line is connected to said radio processing unit, and wherein wherein said prescribed distance is determined so that when said impedance matching element is connected to said feed line, combined conductance of said radiating electrode and said feed line becomes equal to the conductance of the communication circuit, and wherein said prescribed distance is determined by equation $$l = \frac{1}{\beta}\tan^{-1}\left[\frac{-X_{f0}Z_0 \pm \sqrt{(X_{f0}Z_0)^2 - (Z_0^2 - R_{f0}Z_0)(X_{f0}^2 + R_{f0}^2 - Z_0R_{f0})}}{Z_0^2 - R_{f0}Z_0}\right] \quad (1)$$

$$\beta = \frac{2\pi}{\lambda_{eff}}$$

where l represents said prescribed distance, $f_0$ represents said prescribed signal frequency, $R_{f0}$ represents a real component of the impedance that said radiating electrode has at said prescribed signal frequency, $X_{f0}$ represents an imaginary component of the impedance that said radiating electrode has at said prescribed signal frequency, $Z_0$ represents the characteristic impedance of said feed line, $\lambda_{eff}$ represents the wavelength of a signal having said prescribed signal frequency, as computed by considering wavelength shortening due to the material of said substrate, and β is a phase constant.

* * * * *